(12) United States Patent
McQuade et al.

(10) Patent No.: US 10,565,893 B2
(45) Date of Patent: *Feb. 18, 2020

(54) VIRTUAL TRAINER FOR IN VEHICLE DRIVER COACHING AND TO COLLECT METRICS TO IMPROVE DRIVER PERFORMANCE

(71) Applicant: ZONAR SYSTEMS, INC., Seattle, WA (US)

(72) Inventors: Charles Michael McQuade, Issaquah, WA (US); Michael Charles King, Kent, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/863,762

(22) Filed: Jan. 5, 2018

(65) Prior Publication Data

US 2018/0130369 A1 May 10, 2018

Related U.S. Application Data

(63) Continuation of application No. 15/242,847, filed on Aug. 22, 2016, which is a continuation of application
(Continued)

(51) Int. Cl.
*G09B 9/052* (2006.01)
*G07C 5/08* (2006.01)
(Continued)

(52) U.S. Cl.
CPC ......... *G09B 9/052* (2013.01); *G06Q 10/0639* (2013.01); *G06Q 10/06398* (2013.01);
(Continued)

(58) Field of Classification Search
CPC ............... G07C 5/0816; G07C 5/0841; G07C 9/00031; G07C 9/00119; G07C 9/00142;
(Continued)

(56) References Cited

U.S. PATENT DOCUMENTS 3,990,067 A 11/1976 Van Dusen et al.
4,025,791 A 5/1977 Lennington et al.
(Continued)

FOREIGN PATENT DOCUMENTS

CA 2138378 A1 11/1994
CA 2326892 A1 10/1999
(Continued)

OTHER PUBLICATIONS

Ablbright, "Indiana embarks on ambitious RFID roll out," downloaded from http://www.frontlinetoday.com/frontline/articleDetail.jsp?id=19358 on Dec. 15, 2004, 2 pages.
(Continued)

*Primary Examiner* — Atul Trivedi
(74) *Attorney, Agent, or Firm* — Seed IP Law Group LLP

(57) ABSTRACT

A method of providing visual feedback to a driver based on data collected during vehicle operation. A processor at the vehicle analyzes vehicle data, and determines when predetermined threshold values have been reached for particular parameters. Whenever such a threshold is reached, an audible indication is provided to the driver, indicating that the baseline has been exceeded. Certain parameters have at least two threshold values. When a first threshold value is reached, an alert is presented to the driver, but no data is recorded or reported. When a second threshold value is reached, another alert is presented to the driver, and data is recorded for reporting to a driver manager or supervisor. This approach provides a driver warning, that if they correct the triggering behavior, their supervisor is never notified of
(Continued)

that behavior. However, if the behavior escalates, and the second threshold is breached, the behavior is recorded.

19 Claims, 8 Drawing Sheets

Related U.S. Application Data

No. 14/204,906, filed on Mar. 11, 2014, now Pat. No. 9,424,696, which is a continuation-in-part of application No. 14/046,900, filed on Oct. 4, 2013, now Pat. No. 10,185,455.

(60) Provisional application No. 61/800,726, filed on Mar. 15, 2013, provisional application No. 61/711,197, filed on Oct. 8, 2012, provisional application No. 61/710,720, filed on Oct. 7, 2012, provisional application No. 61/710,721, filed on Oct. 7, 2012, provisional application No. 61/709,966, filed on Oct. 4, 2012.

(51) Int. Cl.
*G07C 9/00* (2006.01)
*G06Q 10/06* (2012.01)
*G06Q 10/08* (2012.01)
*G09B 5/12* (2006.01)
*G09B 19/14* (2006.01)

(52) U.S. Cl.
CPC ....... *G06Q 10/0833* (2013.01); *G07C 5/0816* (2013.01); *G07C 5/0841* (2013.01); *G07C 9/00119* (2013.01); *G07C 9/00142* (2013.01); *G09B 5/125* (2013.01); *G09B 19/14* (2013.01); *G07C 9/00031* (2013.01)

(58) Field of Classification Search
CPC ......... G06Q 10/0639; G06Q 10/06398; G06Q 10/0833; Y04S 10/54; G09B 5/125; G09B 9/052; G09B 19/14
USPC .......................................................... 434/66
See application file for complete search history.

(56) References Cited

U.S. PATENT DOCUMENTS

| | | |
|---|---|---|
| 4,258,521 A | 3/1981 | Fricker et al. |
| 4,325,057 A | 4/1982 | Bishop |
| 4,602,127 A | 7/1986 | Neely et al. |
| 4,688,244 A | 8/1987 | Hannon et al. |
| 4,750,197 A | 6/1988 | Denekamp et al. |
| 4,763,356 A | 8/1988 | Day, Jr. et al. |
| 4,799,162 A | 1/1989 | Shinkawa et al. |
| 4,897,792 A | 1/1990 | Hosoi |
| 5,058,044 A | 10/1991 | Stewart et al. |
| 5,068,656 A | 11/1991 | Sutherland |
| 5,128,651 A | 7/1992 | Heckart |
| 5,206,643 A | 4/1993 | Eckelt |
| 5,223,844 A | 6/1993 | Mansell et al. |
| 5,243,343 A | 9/1993 | Moriyasu |
| 5,321,629 A | 6/1994 | Shirata et al. |
| 5,394,136 A | 2/1995 | Lammers et al. |
| 5,399,844 A | 3/1995 | Holland |
| 5,459,304 A | 10/1995 | Eisenmann |
| 5,459,660 A | 10/1995 | Berra |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,628 A | 9/1996 | Kuba et al. |
| 5,572,192 A | 11/1996 | Berube |
| 5,585,552 A | 12/1996 | Heuston et al. |
| 5,600,323 A | 2/1997 | Boschini |
| 5,610,596 A | 3/1997 | Petitclerc |
| 5,629,678 A | 5/1997 | Gargano et al. |
| 5,671,158 A | 9/1997 | Fournier et al. |
| 5,680,328 A | 10/1997 | Skorupski et al. |
| 5,719,771 A | 2/1998 | Buck et al. |
| 5,731,893 A | 3/1998 | Dominique |
| 5,754,965 A | 5/1998 | Hagenbuch |
| 5,758,299 A | 5/1998 | Sandborg et al. |
| 5,768,382 A | 6/1998 | Schneier et al. |
| 5,804,937 A | 9/1998 | Sasajima et al. |
| 5,808,565 A | 9/1998 | Matta et al. |
| 5,839,112 A | 11/1998 | Schreitmueller et al. |
| 5,874,891 A | 2/1999 | Lowe |
| 5,942,753 A | 8/1999 | Dell |
| 5,995,898 A | 11/1999 | Tuttle |
| 6,043,661 A | 3/2000 | Gutierrez |
| 6,049,755 A | 4/2000 | Lou et al. |
| 6,054,950 A | 4/2000 | Fontana |
| 6,078,255 A | 6/2000 | Dividock et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,128,959 A | 10/2000 | McGovern et al. |
| 6,169,943 B1 | 1/2001 | Simon et al. |
| 6,236,911 B1 | 5/2001 | Kruger |
| 6,253,129 B1 | 6/2001 | Jenkins et al. |
| 6,256,579 B1 | 7/2001 | Tanimoto |
| 6,263,273 B1 | 7/2001 | Henneken et al. |
| 6,278,928 B1 | 8/2001 | Aruga et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,891 B1 | 6/2002 | Jones |
| 6,438,472 B1 | 8/2002 | Tano et al. |
| 6,450,411 B1 | 9/2002 | Rash et al. |
| 6,456,039 B1 | 9/2002 | Lauper et al. |
| 6,498,976 B1 | 12/2002 | Ehlbeck et al. |
| 6,505,106 B1 | 1/2003 | Lawrence et al. |
| 6,529,808 B1 | 3/2003 | Diem |
| 6,539,296 B2 | 3/2003 | Diaz et al. |
| 6,594,621 B1 | 7/2003 | Meeker |
| 6,597,973 B1 | 7/2003 | Barich et al. |
| 6,614,392 B2 | 9/2003 | Howard |
| 6,664,897 B2 | 12/2003 | Pape et al. |
| 6,671,646 B2 | 12/2003 | Manegold et al. |
| 6,708,113 B1 | 3/2004 | Von Gerlach et al. |
| 6,735,542 B1 | 5/2004 | Burgett et al. |
| 6,801,901 B1 | 10/2004 | Ng |
| 6,804,626 B2 | 10/2004 | Manegold et al. |
| 6,834,259 B1 | 12/2004 | Markwitz et al. |
| 6,847,887 B1 | 1/2005 | Casino |
| 6,856,897 B1 | 2/2005 | Phuyal et al. |
| 6,894,617 B2 | 5/2005 | Richman |
| 6,909,947 B2 | 6/2005 | Douros et al. |
| 7,027,955 B2 | 4/2006 | Markwitz et al. |
| 7,035,733 B1 | 4/2006 | Alwar et al. |
| 7,048,185 B2 | 5/2006 | Hart |
| 7,103,460 B1 | 9/2006 | Breed |
| 7,174,243 B1 | 2/2007 | Lightner et al. |
| 7,174,277 B2 | 2/2007 | Vock et al. |
| 7,184,866 B2 | 2/2007 | Squires et al. |
| 7,254,516 B2 | 8/2007 | Case, Jr. et al. |
| 7,424,414 B2 | 9/2008 | Craft |
| 7,692,552 B2 | 4/2010 | Harrington et al. |
| 7,859,392 B2 | 12/2010 | McClellan et al. |
| 8,095,938 B1 | 1/2012 | Xie et al. |
| 8,577,703 B2 | 11/2013 | McClellan et al. |
| 8,604,920 B2 | 12/2013 | Armitage et al. |
| 8,694,328 B1 | 4/2014 | Gormley |
| 8,849,501 B2 | 9/2014 | Cook et al. |
| 8,918,229 B2 | 12/2014 | Hunt et al. |
| 8,930,040 B2 | 1/2015 | Gompert et al. |
| 8,996,287 B2 | 3/2015 | Davidson et al. |
| 9,067,565 B2 * | 6/2015 | McClellan ........... B60R 25/102 |
| 9,082,239 B2 | 7/2015 | Ricci |
| 9,466,161 B2 | 10/2016 | Ricci |
| 9,545,930 B2 | 1/2017 | Ricci |
| 9,715,711 B1 | 7/2017 | Konrardy et al. |

(56) References Cited

U.S. PATENT DOCUMENTS

| | | |
|---|---|---|
| 9,767,516 B1 | 9/2017 | Konrardy et al. |
| 2001/0047283 A1 | 11/2001 | Melick et al. |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0022984 A1 | 2/2002 | Daniel et al. |
| 2002/0065698 A1 | 5/2002 | Schick et al. |
| 2002/0104323 A1 | 8/2002 | Rash et al. |
| 2002/0107833 A1 | 8/2002 | Kerkinni et al. |
| 2002/0107873 A1 | 8/2002 | Winkler et al. |
| 2002/0111725 A1 | 8/2002 | Burge |
| 2002/0116122 A1 | 8/2002 | Satonaka |
| 2002/0122583 A1 | 9/2002 | Thompson |
| 2002/0133273 A1 | 9/2002 | Lowrey et al. |
| 2002/0133275 A1 | 9/2002 | Thibault |
| 2002/0147610 A1 | 10/2002 | Tabe |
| 2002/0150050 A1 | 10/2002 | Nathanson |
| 2002/0156558 A1 | 10/2002 | Hanson et al. |
| 2002/0163449 A1 | 11/2002 | Flick |
| 2002/0165669 A1 | 11/2002 | Pinto et al. |
| 2002/0178147 A1 | 11/2002 | Arrayo et al. |
| 2002/0188593 A1 | 12/2002 | Moser et al. |
| 2003/0030550 A1 | 2/2003 | Talbot |
| 2003/0033061 A1 | 2/2003 | Chen et al. |
| 2003/0033071 A1 | 2/2003 | Kawasaki |
| 2003/0048257 A1 | 3/2003 | Mattila |
| 2003/0109973 A1 | 6/2003 | Hensey et al. |
| 2003/0120745 A1 | 6/2003 | Katagishi et al. |
| 2003/0182033 A1 | 9/2003 | Underdahl et al. |
| 2004/0009819 A1 | 1/2004 | Koga |
| 2004/0054470 A1 | 3/2004 | Farine et al. |
| 2004/0236596 A1 | 11/2004 | Chowdhary et al. |
| 2004/0243368 A1 | 12/2004 | Hiemer et al. |
| 2005/0107946 A1 | 5/2005 | Shimizu et al. |
| 2005/0131597 A1 | 6/2005 | Raz et al. |
| 2005/0209775 A1 | 9/2005 | Entenmann |
| 2005/0273250 A1 | 12/2005 | Hamilton et al. |
| 2007/0001831 A1 | 1/2007 | Raz et al. |
| 2007/0050108 A1 | 3/2007 | Larschan et al. |
| 2007/0083314 A1 | 4/2007 | Corigliano et al. |
| 2007/0156337 A1 | 7/2007 | Yanni |
| 2007/0179709 A1 | 8/2007 | Doyle |
| 2008/0154489 A1 | 6/2008 | Kaneda et al. |
| 2008/0154712 A1 | 6/2008 | Wellman |
| 2008/0160491 A1 | 7/2008 | Allen et al. |
| 2008/0243389 A1 | 10/2008 | Inoue et al. |
| 2008/0262646 A1 | 10/2008 | Breed |
| 2008/0319602 A1 | 12/2008 | McClellan et al. |
| 2009/0143923 A1 | 6/2009 | Breed |
| 2009/0156310 A1 | 6/2009 | Fargo |
| 2009/0167699 A1 | 7/2009 | Rosenblatt et al. |
| 2009/0186325 A1 | 7/2009 | Kumar |
| 2009/0284361 A1 | 11/2009 | Boddie et al. |
| 2010/0160013 A1 | 6/2010 | Sanders |
| 2010/0209884 A1 | 8/2010 | Lin et al. |
| 2010/0209890 A1 | 8/2010 | Huang et al. |
| 2010/0209891 A1 | 8/2010 | Lin et al. |
| 2010/0211278 A1 | 8/2010 | Craig et al. |
| 2011/0112739 A1 | 5/2011 | O'Dea et al. |
| 2011/0148618 A1 | 6/2011 | Harumoto et al. |
| 2011/0161116 A1 | 6/2011 | Peak et al. |
| 2011/0301802 A1 | 12/2011 | Rupp et al. |
| 2011/0320492 A1 | 12/2011 | Inghelbrecht et al. |
| 2012/0140080 A1* | 6/2012 | Taylor .............. B60C 23/0408 348/148 |
| 2012/0212353 A1 | 8/2012 | Fung et al. |
| 2012/0239452 A1 | 9/2012 | Trivedi et al. |
| 2012/0253892 A1* | 10/2012 | Davidson .............. G06Q 10/08 705/7.42 |
| 2012/0256770 A1 | 10/2012 | Mitchell |
| 2012/0296683 A1 | 11/2012 | Groeneweg et al. |
| 2013/0046559 A1 | 2/2013 | Coleman et al. |
| 2013/0082933 A1 | 4/2013 | Liang et al. |
| 2013/0138591 A1* | 5/2013 | Ricci .............. H04W 4/90 706/46 |
| 2013/0164712 A1 | 6/2013 | Hunt et al. |
| 2013/0164713 A1 | 6/2013 | Hunt et al. |
| 2013/0164715 A1 | 6/2013 | Hunt et al. |
| 2013/0166170 A1 | 6/2013 | Hunt et al. |
| 2013/0169900 A1 | 7/2013 | Dighde |
| 2013/0184965 A1 | 7/2013 | Hunt et al. |
| 2013/0209968 A1 | 8/2013 | Miller et al. |
| 2013/0214986 A1 | 8/2013 | Zhu et al. |
| 2013/0274955 A1 | 10/2013 | Rosenbaum |
| 2013/0293425 A1 | 11/2013 | Zhu et al. |
| 2013/0345927 A1 | 12/2013 | Cook et al. |
| 2014/0009344 A1 | 1/2014 | Zhu et al. |
| 2014/0195106 A1* | 7/2014 | McQuade .............. G07C 5/0841 701/33.9 |
| 2014/0195310 A1* | 7/2014 | McQuade ........ G06Q 10/06393 705/7.39 |
| 2014/0257943 A1 | 9/2014 | Nerayoff et al. |
| 2014/0278574 A1* | 9/2014 | Barber .............. B60W 40/09 705/4 |
| 2014/0309849 A1* | 10/2014 | Ricci .............. H04W 4/44 701/33.4 |
| 2014/0350777 A1 | 11/2014 | Kawai et al. |
| 2014/0365070 A1 | 12/2014 | Yano et al. |
| 2015/0291176 A1 | 10/2015 | Jeong et al. |
| 2016/0046298 A1* | 2/2016 | DeRuyck .............. B60W 40/09 340/576 |
| 2016/0318468 A1 | 11/2016 | Ricci |
| 2016/0318524 A1 | 11/2016 | Ricci |
| 2016/0342924 A1* | 11/2016 | Hunt .............. G09B 19/167 |
| 2017/0178424 A1 | 6/2017 | Wright |
| 2017/0206717 A1* | 7/2017 | Kuhnapfel .............. H04L 67/22 |
| 2017/0263061 A1* | 9/2017 | Mann .............. G07C 5/0808 |
| 2017/0263120 A1* | 9/2017 | Durie, Jr. .............. G08G 1/205 |
| 2018/0075309 A1* | 3/2018 | Sathyanarayana ... G05D 1/0088 |
| 2018/0075380 A1* | 3/2018 | Perl .............. G06Q 10/0635 |
| 2018/0315318 A1* | 11/2018 | Farnham, IV ...... G06F 3/04817 |
| 2019/0102840 A1* | 4/2019 | Perl .............. G06N 3/08 |

FOREIGN PATENT DOCUMENTS

| | | |
|---|---|---|
| CA | 2 388 572 A1 | 5/2001 |
| EP | 2 116 968 A1 | 11/2009 |
| JP | 2001-280985 A | 10/2001 |
| WO | 03/023550 A2 | 3/2003 |

OTHER PUBLICATIONS

Anonymous, "Transit agency builds GIS to plan bus routes," *American City & County* 118(4):14-16, 2003.

Auto Channel, "Nextel, Motorola and Symbol Technologies Offer First Wireless Bar Code Scanner for Mobile Phones," downloaded from http://www.theautochannel.com/news/2003/06/11/162927.html on Oct. 29, 2004, 3 pages.

Child Check-mate Systems Inc., "What is the Child Check-Mate Safety System?" downloaded from http://www.childcheckmate.com/what.html on Apr. 7, 2004, 5 pages.

Detex Corporation, "Detex Announces the Latest Innovation in Guard Tour Verification Technology," downloaded from http://detex.com/NewsAction.jspa?id=3 on Mar. 8, 2005, 1 page.

Dwyer et al., "Analysis of the Performance and Emissions of Different Bus Technologies on the city of San Francisco Routed," *Commercial Vehicle Engineering Congress and Exhibition*, Oct. 26-28, 2004, society of Automotive Engineers, Inc., 2 pages.

FleeTTrakkeR LLC., "D.O.T. Driver Vehicle Inspection Reports on your wireless phone!" downloaded from http://www.fleettrackker.com/web/findoutmore.jsp on Mar. 12, 2004, 3 pages.

GCS General Control Systems, "Contact GCS (UK), Tewkesbury Gloucestershire," downloaded from http://www.gcs.at/eng/news/allgemein.htm on Apr. 21, 2005, 2 pages.

GCS General Control Systems, "The Data Acquisition Unit Escorte," downloaded from http://www.gcs.at/eng/produkte/hw/escorte.htm on Apr. 21, 2005, 4 pages.

GCS General Control Systems, "The PenMaster," downloaded from http://www.gcs.at/eng/produkte/hw/penmaster.htm on Apr. 5, 2007, 3 pages.

(56) References Cited

OTHER PUBLICATIONS

Kurtz, "Indiana's E-Government: A Story Behind Its Ranking," *Incontext 4*(1): downloaded from http://www.incontect.indiana.edu/2003/jan-feb03/government.html on Feb. 14, 2005, 5 pages.

Nerac, Inc., "ObjectFX Integrates TrackingAdvisor with Qualcomm's FleetAdvisor System; Updated Version Offers Benefit of Visual Display of Vehicles and Routes to Improve Fleet Productivity." Downloaded from http://web.nerac.com/php/cust_%20access/ncp/index.php?SESSION=D773F464009103%2052&me . . . on Sep. 21, 2006, 4 pages.

Nerac, Inc., "Tracking our of route: software helps fleets compare planned routed to actual miles. (Technology)," *Commercial Carrier Journal 162*(10): 2005, 4 pages.

Quaan, "Guard Tour Systems," downloaded from http://www.securitymanagement.com/ubb/Forum30/HTML/000066.html on Mar. 8, 2005, 1 page.

Senger, "Inside RF/ID: Carving a Niche Beyond Asset Tracking," downloaded from http://www.businesssolutionsmag.com/ Articles/1999_02/990208.htm on Dec. 6, 2004, 5 pages.

Tiscor, "Inspection Manager 6.0 User Guide," TISCOR. U.S., a division of Brady Worldwide, 2004, 73 pages.

Tiscor. "Who Is TISCOR?" TISCOR. U.S., a division of Brady Worldwide, slide presentation, Sep. 2004, 19 pages.

Tsakiri et al., "Urban fleet monitoring with GPS and GLONASS," *Journal of Navigation 51*(3):382-393, 1998, 2 pages.

Tuttle, "Digital RF/ID Enhances GPS," *Proceedings of the Second Annual Wireless Symposium*, Feb. 15-18, 1994, Santa Clara, California, pp. 406-411.

Want, "RFID : A Key to Automating Everything," *Scientific American 290*(1):56-65, 2004.

\* cited by examiner

VIRTUAL TRAINER FOR IN VEHICLE DRIVER COACHING AND TO COLLECT METRICS TO IMPROVE DRIVER PERFORMANCE

RELATED APPLICATIONS

This application is a continuation of application Ser. No. 15/242,847, filed Aug. 22, 2016, which is a continuation of application Ser. No. 14/204,906 filed on Mar. 11, 2014, which is a continuation-in-part of application Ser. No. 14/046,900, filed on Oct. 4, 2013, and which is also based on the following prior provisional applications: Ser. No. 61/800,726 filed on Mar. 15, 2013, Ser. No. 61/711,197, filed on Oct. 8, 2012, Ser. No. 61/710,721, filed on Oct. 7, 2012, Ser. No. 61/710,720, filed on Oct. 7, 2012, and Ser. No. 61/709,966, filed on Oct. 4, 2012, the benefits of the filing dates of which are hereby claimed under 35 U.S.C. § 119(e) and 35 U.S.C. § 120.

BACKGROUND

As the cost of sensors, communications systems and navigational systems has dropped, operators of commercial and fleet vehicles now have the ability to collect a tremendous amount of data about the vehicles that they operate, including how the vehicles are being driven by the drivers operating such vehicles.

Unfortunately, simply collecting such data does not automatically translate into cost savings. It would be desirable to provide such fleet operators with additional tools in order to derive a benefit from the wealth of data that can be collected. Preferably, such tools can be used to provide feedback to drivers to enable the fleet operator to encourage driving habits leading to cost savings. Such a tool might thus be used to develop objective criteria that could be used encourage and provide incentives to drivers to improve their performance in operating the vehicles in a fleet.

SUMMARY

One aspect of the novel concepts presented herein is a method of providing feedback to a driver based on empirical data collected during vehicle operation, where the feedback is provided visually. A processor at the vehicle analyzes a plurality of sensor and data inputs, and determines when predetermined threshold values have been reached for particular parameters. Whenever such a threshold is reached, a visual and/or audible alert is output to the driver. In at least one exemplary embodiment, certain parameters have at least two threshold values. When a first threshold value is reached, an alert is presented to the driver, but no data is recorded or reported. When a second threshold value is reached, an alert is presented to the driver, and data is recorded, and may be transmitted in real-time to a driver manager or supervisor (and/or a monitoring service). The tiered threshold approach provides a warning to a driver, such that if they correct the behavior triggering the warning, their supervisor is never notified of that behavior. However, if the behavior escalates, and the second threshold is breached, the behavior is recorded, and the driver may be called to task. In at least one embodiment, rather than (or in addition to) multiple threshold values, a time component is employed. For example, if a threshold value is reached, the driver is alerted in the vehicle, and timer function is engaged. The driver will have a certain amount of time to modify their behavior, and if the driving behavior triggering the alert is not corrected, then the behavior will be recorded and reported. Different behaviors may have different time periods. The time remaining until the behavior is reported can be output to the driver. Subsequent events may trigger successively shorter time periods.

In at least one exemplary embodiment, a specific type of driver behavior to be monitored is excessive idle time. In at least one exemplary embodiment, a specific type of driver behavior to be monitored is speeding. In at least one exemplary embodiment, a specific type of driver behavior to be monitored is hard braking. Combinations and permutations of different behaviors can be implemented in the same monitoring paradigm.

Another aspect of the concepts disclosed herein is a driver coaching tool including a display to be used in connection with a telematics device that itself does not include a display. The processing is provided in the telematics device, and visual feedback, based on empirical data collected during vehicle operation, is output to the driver on the display. In at least one embodiment, the driver coaching tool includes the ability to provide audible alerts. In at least one embodiment, the driver coaching tool includes a scanner that reads a driver card, enabling drivers to be uniquely identified. In at least one embodiment such a scanner is an RFID card reader. In at least one related embodiment, the driver coaching tool does not analyze vehicle data to determine if an alert is issued, as that function is implemented by a processor in a different component, such as a telematics device. In at least one related embodiment, the driver coaching tool does include a processor to analyze vehicle data to determine if an alert is issued. In at least one related embodiment, the driver coaching tool is a mobile tablet computing driver that includes a driver behavior application. In a related embodiment, the tablet includes at least one additional application specifically related to telematics.

One aspect of the concepts disclosed herein is a controller configured to execute a driver behavior monitoring application whenever a driver has logged onto the mobile computing device, the driver behavior monitoring application presenting information to the driver regarding his driving behavior as either an icon or a text (or both) on the display at all times. In an exemplary embodiment the information highlights behavior the driver needs to focus on improving in the current driving session, based on past performance.

It should be recognized that the steps of collecting the plurality of metrics and processing the plurality of metrics to determine the numerical feedback of the driver's performance can be implemented in physically different locations. In one embodiment, the plurality of metrics are automatically collected by the vehicle, then transmitted to a remote computing device for processing, then sent back to the vehicle to provide driver feedback. In other embodiments, processing of the plurality of the metrics occurs within the vehicle. Providing drivers with feedback in real-time will enable drivers to correct driving habits while operating the vehicle, leading to an improved performance feedback.

The above noted methods are preferably implemented by at least one processor (such as a computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a high level flow chart showing the overall method steps implemented in accord with one exemplary embodiment for achieving the concepts disclosed herein;

FIG. 2 schematically illustrates a vehicle that includes a plurality of sensors configured to collect the required metrics;

FIG. 3 is a functional block diagram illustrating the functional elements of an embodiment in which the metrics are processed by a computing device remote from the vehicle;

FIG. 4 schematically illustrates a vehicle that includes a GPS unit with a wireless transmitter utilized in some embodiments disclosed herein;

Figure 9:
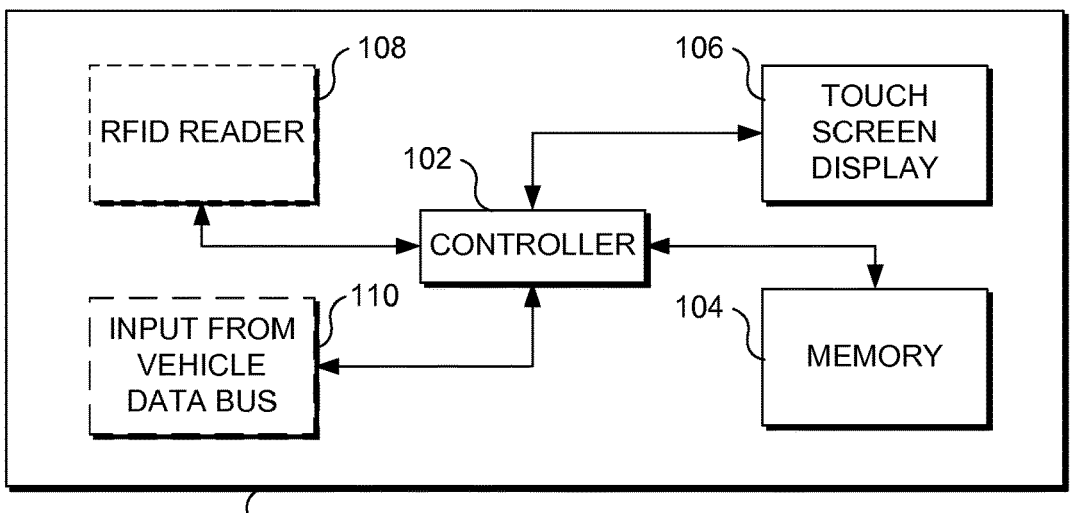
FIG. 9 is a functional block diagram of an exemplary telematics oriented tablet for in vehicle use that may be employed in accord with some aspect of the concepts disclosed herein.
Figure 10:
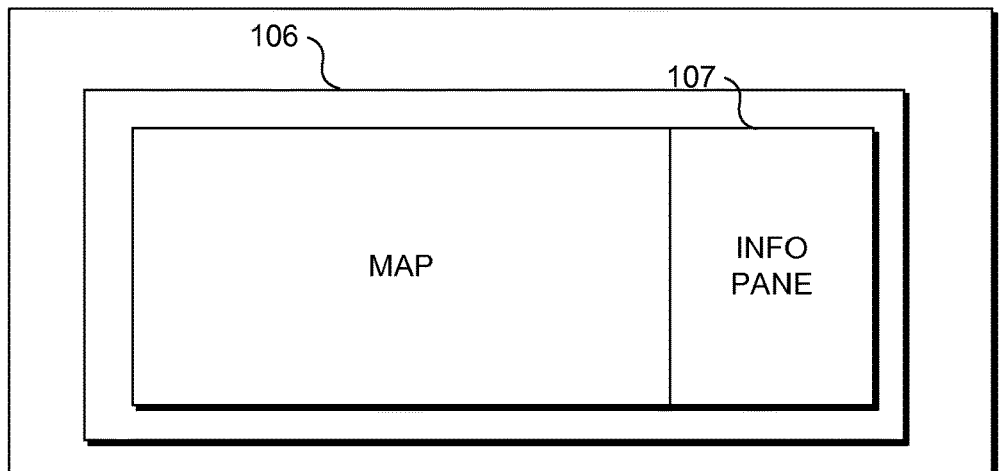
FIG. 10 is a functional block diagram of an exemplary telematics oriented tablet for in vehicle use implementing a navigation app that is presented to the driver during vehicle operation, such that an info pane is not consumed by the map portion, and any driver feedback alert disclosed herein can be visually presented to the driver on the info pane.
Figure 11:
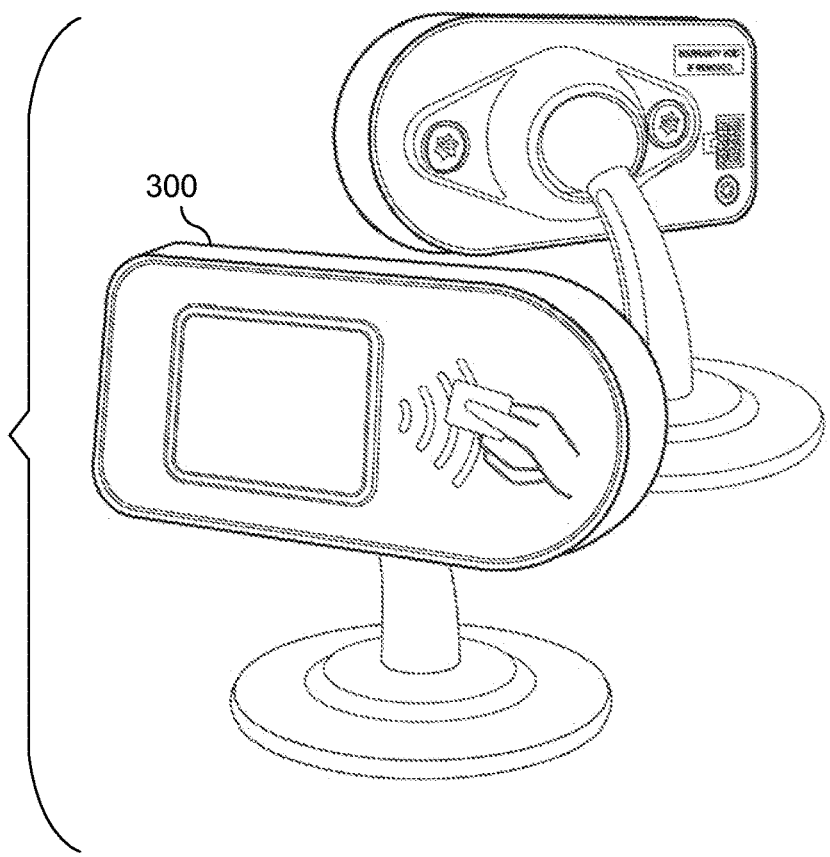
Figure 12:
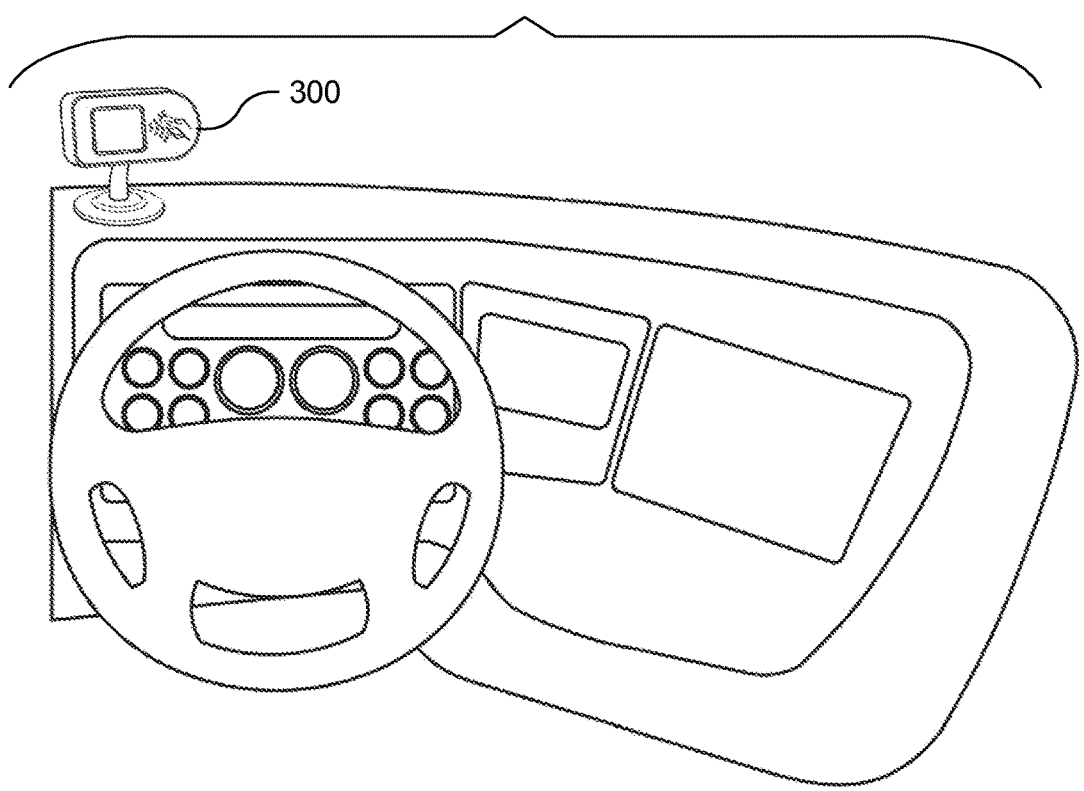
Figure 13:
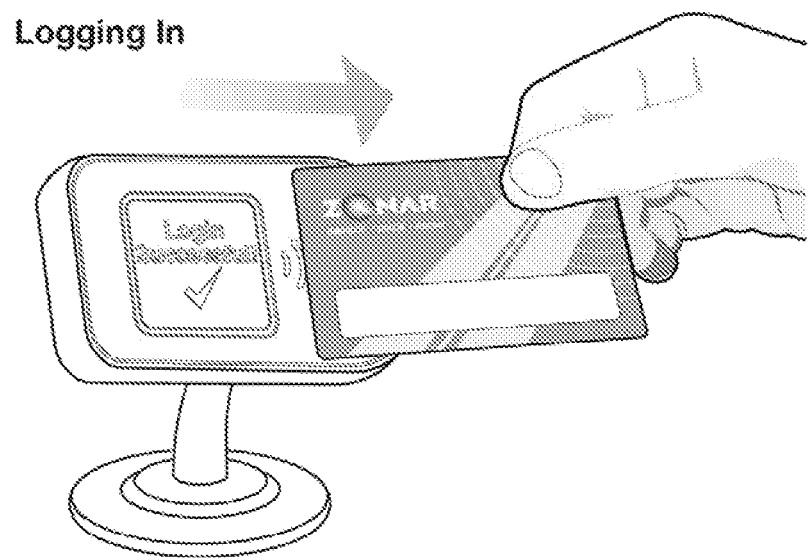
Figure 14:
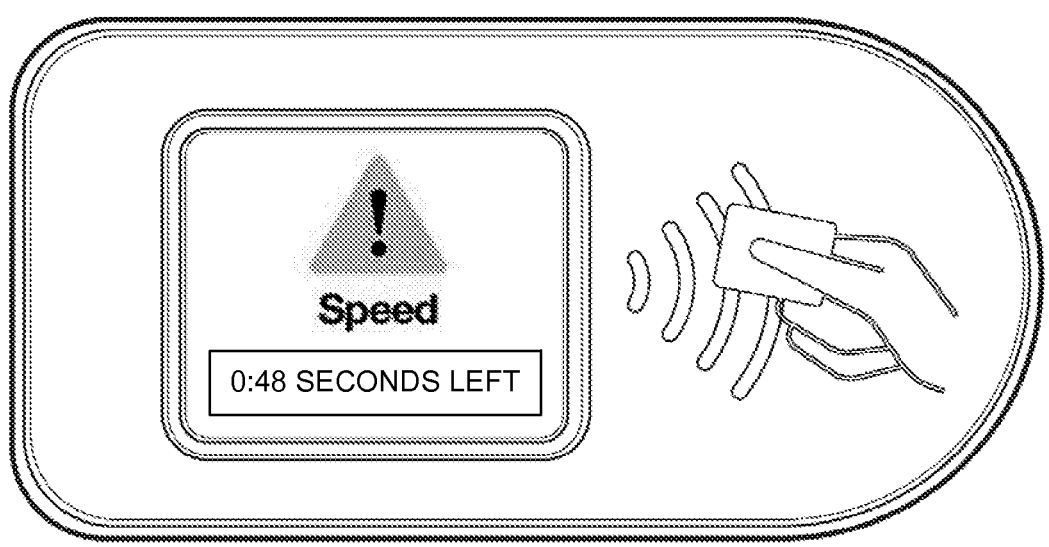
Figure 15:
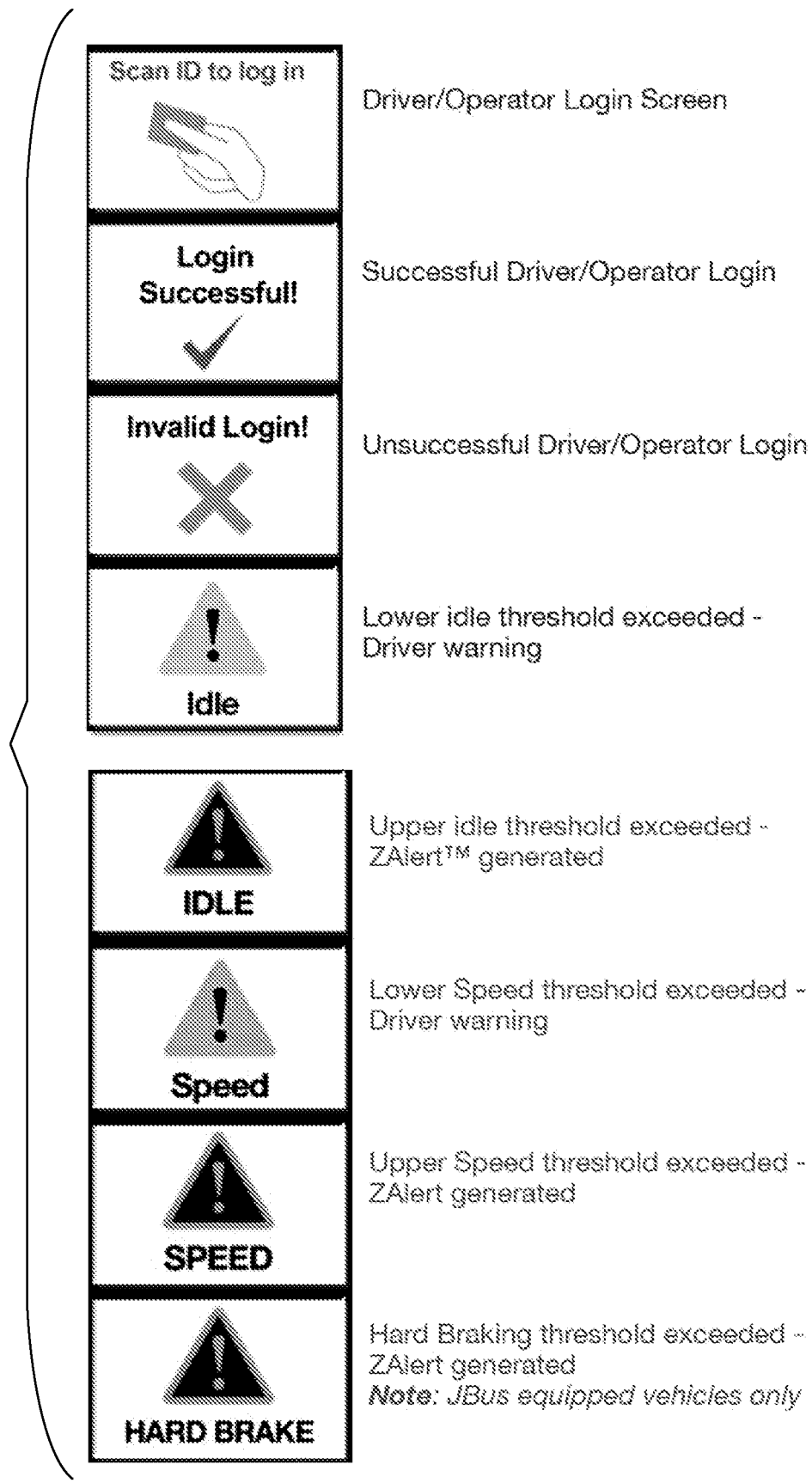

FIG. 11 schematically illustrates an accessory display that can be used along with a processor in the vehicle to provide feedback to a driver, in accord with the concepts disclosed herein, where the accessory display can also be used to uniquely log in drivers, so any reports identify the correct driver;

FIG. 12 schematically illustrates the accessory display of FIG. 11 mounted on the dash of a vehicle, where it can be readily seen by a driver without obscuring the driver's view of the road or dash;

FIG. 13 schematically illustrates a driver logging into the driver feedback system using the accessory display of FIG. 11 and an RFID driver card;

FIG. 14 schematically illustrates the accessory display of FIG. 11 being utilized in an embodiment where a driver is given a specific period of time to correct his driving behavior (such as speeding) before an event is reported; and FIG. 15 graphically illustrates exemplary icons that can be used to provide driver feedback using the accessory display of FIG. 11, and/or the tablets of FIGS. 9 and 10.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Exemplary Logic for Determining Driver Performance

Figure 1:
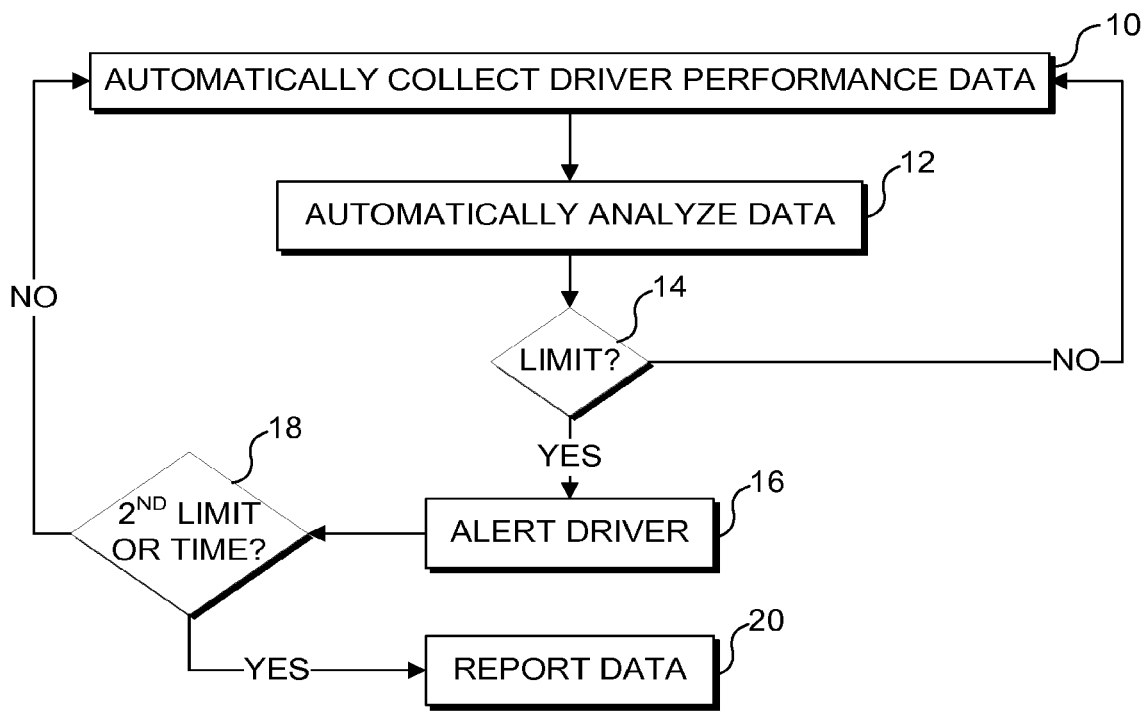

FIG. 1 is a high level flow chart showing the overall method steps implemented in accord with one aspect of the concepts disclosed herein. In a block 10 a plurality of metrics related to driver performance are automatically collected by a plurality of sensors incorporated into a vehicle. Such metrics generally relate to driver operation of the vehicle, and may also simply include data related to the vehicle. Such metrics can include, but are not limited to, vehicle speed, vehicle acceleration, vehicle deceleration, engine RPMs, idle time, engine temperature, coolant temperature, oil temperature, fuel consumption, braking data, and vehicle positional data. Those of ordinary skill in the art will readily recognize that many different metrics related to vehicle performance and driver performance can be collected. Thus, it should be recognized that the specifically identified metrics are intended to be exemplary, rather than limiting. In a block 12, the collected data is automatically analyzed. In most embodiments the data will be analyzed at the vehicle, so driver feedback can be provided at the vehicle without any delay that may occur if the data were transmitted to a remote computing device for analysis, and then returned to the vehicle to present feedback to the driver. It should be understood however, that remote processing of the data, with performance feedback being returned to the vehicle, is encompassed by the concepts disclosed herein.

In a decision block 14 it is determined if any of the collected data meets a predefine threshold or limit. In at least some embodiments, the thresholds are defined by a vendor providing a driver behavior monitoring service, which can be included with other telematics services being provided by the vendor. In at least some embodiments, the thresholds are defined by an end user, generally an entity (company and governmental agencies being exemplary but not limiting types of entities) that operates a fleet of vehicles equipped with systems required to implement one or more of the driver behavior paradigms disclosed herein. In most embodiments the threshold will be a numerical quantity related to a single parameter, such as engine idle, braking (deceleration), and/or speed. It should be understood that other metrics can be defined that include more than one parameter (such as speed and duration of a speed event, or idles and a duration of an idle event), such that the limit of block 14 is not meet until all threshold values for all components in the parameter are met. If no limit/threshold has been met, then the logic loops back to block 10 and more data is collected during vehicle operation. However, if a limit/threshold has been met, then the logic moves to a block 16 and the driver is notified. In most embodiments, the alerting function is implemented visually. In some embodiments, the alert can be implemented audibly, or using a combination of visual and audible cues. Significantly, the alert of block 16 is not recorded, and is only presented to the driver (i.e., the driver's employer/supervisor is not alerted, and the breaching of the limit is not recorded). Thus, the driver has an opportunity to moderate his behavior, before being subject to any discipline. The alert should be designed to inform the driver what behavior needs to be modified (speeding, excess idle, hard braking, etc.).

In a decision block 18, more data is collected and analyzed. If any data collected subsequent to the alert of block 16 exceeds a second limit/threshold, or if a duration of a driver behavior event detected in block 14 (speeding, idling, etc.) exceeds a predetermined time limit, then the logic proceeds to a block 20 and the event is reported (generally to the owner of the vehicle or the entity operating the vehicle if the vehicle is leased).

In at least one exemplary embodiment, logic of FIG. 1 is modified such that regardless of whether a duration of a trigger event exceeds a predetermined period, or a second threshold event occurs (see block 18), no events will be recorded until some predetermined number of events occur (i.e., the driver is given a "pass" for first 1, 2, 3, 4, or 5 events on a given day (such numbers of "free" events are exemplary, and not limiting. This can represent an important practice for gaining driver cooperation for the new system, and for reducing driver anxiety. The number of free events can be reduced over time, and completely eliminated if desired, after some introductory period. In at least one embodiment, a fleet operator can reset the number of free events on a per vehicle basis remotely. The logic controlling the processor implementing the functions of FIG. 1 is revised to implement the number of free events desired by the fleet operator. The fleet operator can raise or lower a number of free events fleet wide, or on a driver by driver basis. In some embodiments, individualized settings per driver are broadcast to the entire fleet (and stored in each vehicle), and the processor at the vehicle determines which driver has logged in, and uses individualized settings for that driver. Such individualized settings can apply not only to the number of free events, but to any parameter used in the driver feedback system (i.e., what the threshold settings are, what time period is used before reporting an event, which events are included in the driver feedback system). This gives the fleet operator flexibility to customize the driver feedback program.

Figure 2:
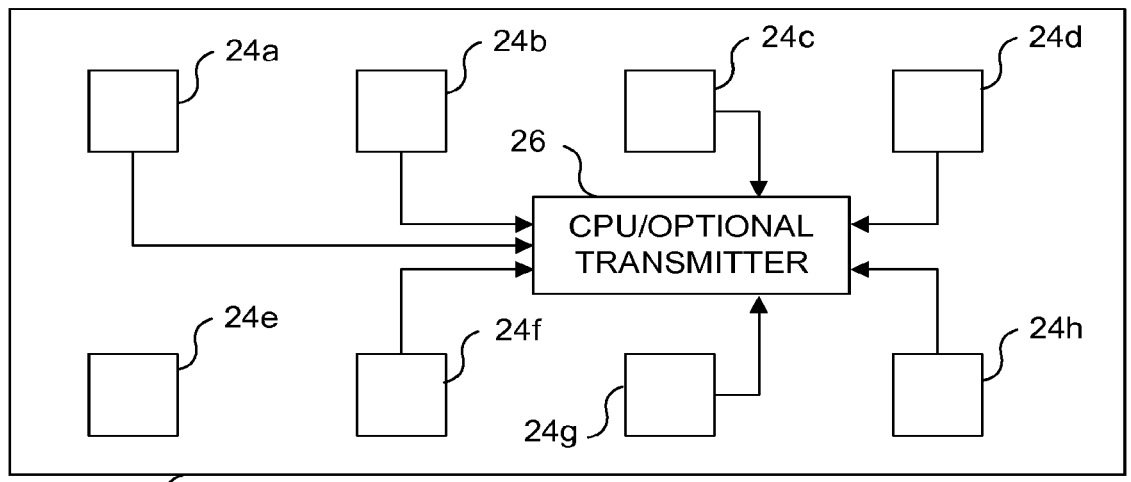

FIG. 2 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

Figure 3:
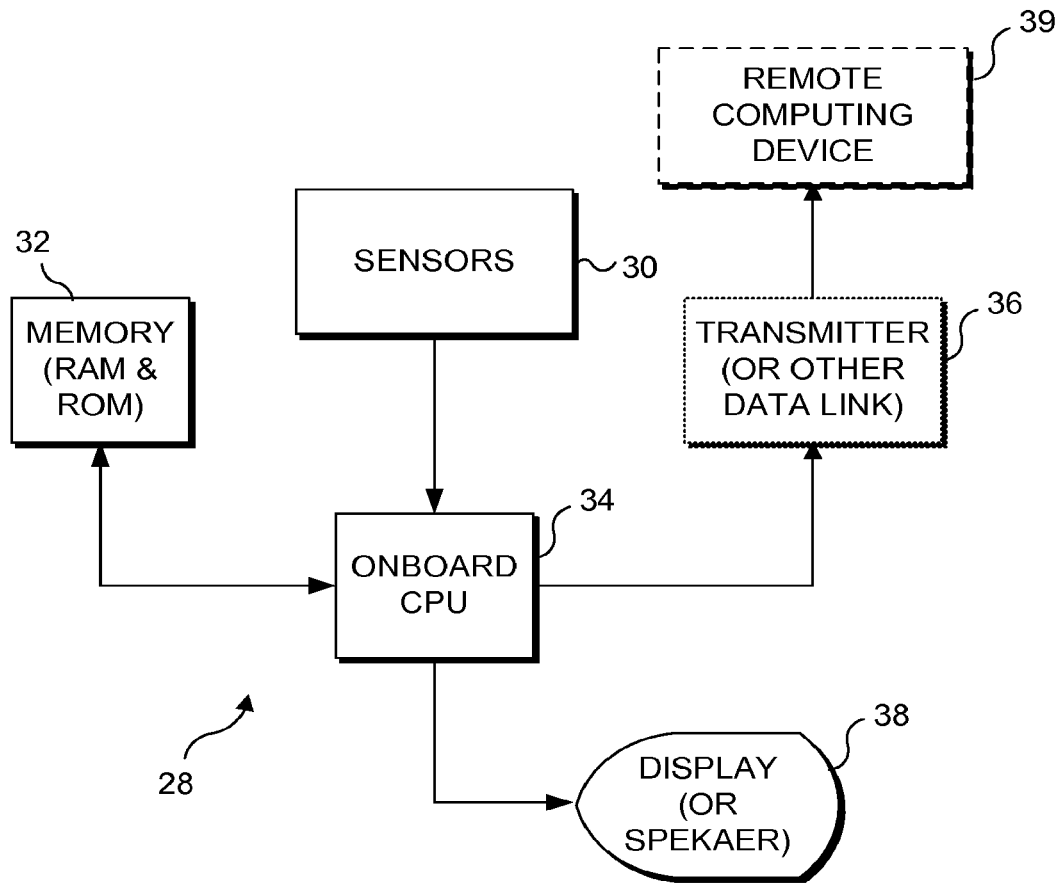

FIG. 3 is a functional block diagram 28 illustrating the functional elements of an exemplary embodiment in which the metrics are processed within the vehicle. The vehicle is equipped with sensors 30 configured to collect the required metrics. The sensors are logically coupled with an onboard vehicle CPU 34, which is configured to implement the method steps generally described above. CPU 34 is logically coupled to a memory 32 in which are stored the machine instructions that are executed by the CPU to carry out these logical steps. The plurality of metrics collected by sensors 30 can also be stored in memory 32. A (preferably optical or wireless) transmitter 36 (or other data link) can be included to enable either the plurality of metrics or the analysis to be communicated to a remote computing device 39 (for later analysis, or to process per the method of FIG. 1 and return to the vehicle to provide feedback to the driver; noting that such an embodiments is practical only if a reliable 2-way data link is present). A display 38 is included in the vehicle to provide real-time feedback to the driver (noting that the concepts disclosed herein also encompass using audible feedback instead of or in addition to visual feedback).

Figure 4:
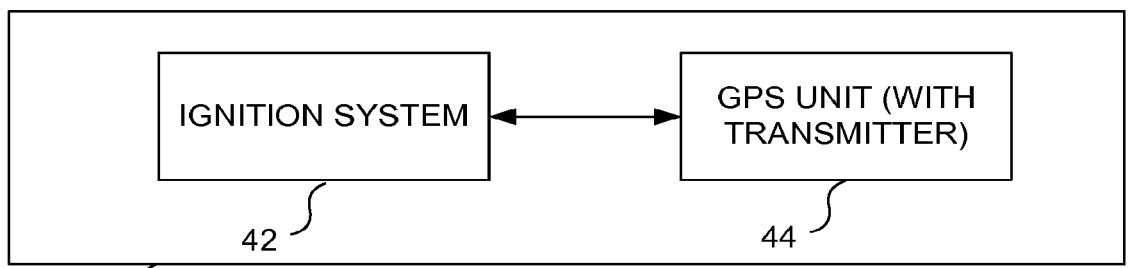

FIG. 4 schematically illustrates a vehicle 22a that includes a GPS unit 44 configured to collect GPS data that can be used to determine a plurality of metrics for use in determining a driver performance feedback. Such an embodiment enables the driver performance feedback discussed above to be generated without requiring individual or additional sensors to be integrated into the vehicle (although it should be recognized that such individual sensors could be used in addition to (or as an alternative source of) the data provided by the GPS unit, to provide additional metrics used in determining a driver's performance feedback, generally consistent with the method steps described above with respect to FIG. 1). Vehicle 22a, such as a bus or a truck (or automobile, or construction equipment, generally as described above) includes GPS unit 44 coupled with an ignition system 42 of the vehicle. In an exemplary embodiment, the GPS unit will be coupled with the ignition switch, such that it is assumed that when the ignition switch is on, the engine of the vehicle is actually running, and the GPS unit will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a specific time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/deceleration internally, and these metrics would then not need to be determined by an external computing device (remote or local).

GPS unit 44 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics. It should be recognized that as an alternative, GPS unit 44 can include an onboard memory, such that the GPS data are stored in the GPS unit, to be uploaded to a remote computing device at a later time (for example, using a wireless or hardwired data link). Significantly, GPS unit 44 enables an analysis of driver performance or vehicle performance to be determined, even if the vehicle is not equipped with other sensors for collecting driver performance metrics, or an onboard computer (as are required in the embodiments of FIGS. 2 and 3). It should be understood that the concepts disclosed herein encompasses coupling such a GPS unit to vehicle sensors and/or a vehicle data bus, such that driver/vehicle performance data collected by other vehicle sensors can be combined with GPS data and conveyed to a remote computing site. While not specifically shown in FIG. 4, it should be understood that GPS unit 44 can include a processor that uses GPS data and sensor data collected from the vehicle to calculate performance metrics, which are then combined with GPS data and conveyed to the remote computing site.

Hosted Web Site for Tracking Vehicle/Driver Performance Data

One aspect of the concepts disclosed herein is a hosted website, enabling drivers and fleet operators to monitor the performance of drivers and/or vehicles, based on data collected during the drivers operation of a vehicle.

In general, one or more performance metrics are automatically collected while a driver is operating a vehicle, and that data is used to generate a score or rating of the driver's or vehicle's performance. In addition to presenting feedback to the driver in the vehicle, when certain triggers or thresholds are breached, that data is also sent to the hosted website. In some embodiments, drivers can review the driver feedback for other drivers, while in some embodiments; drivers can only review their feedback. In still other embodiments, only managers can review driver feedback data.

Figure 5:
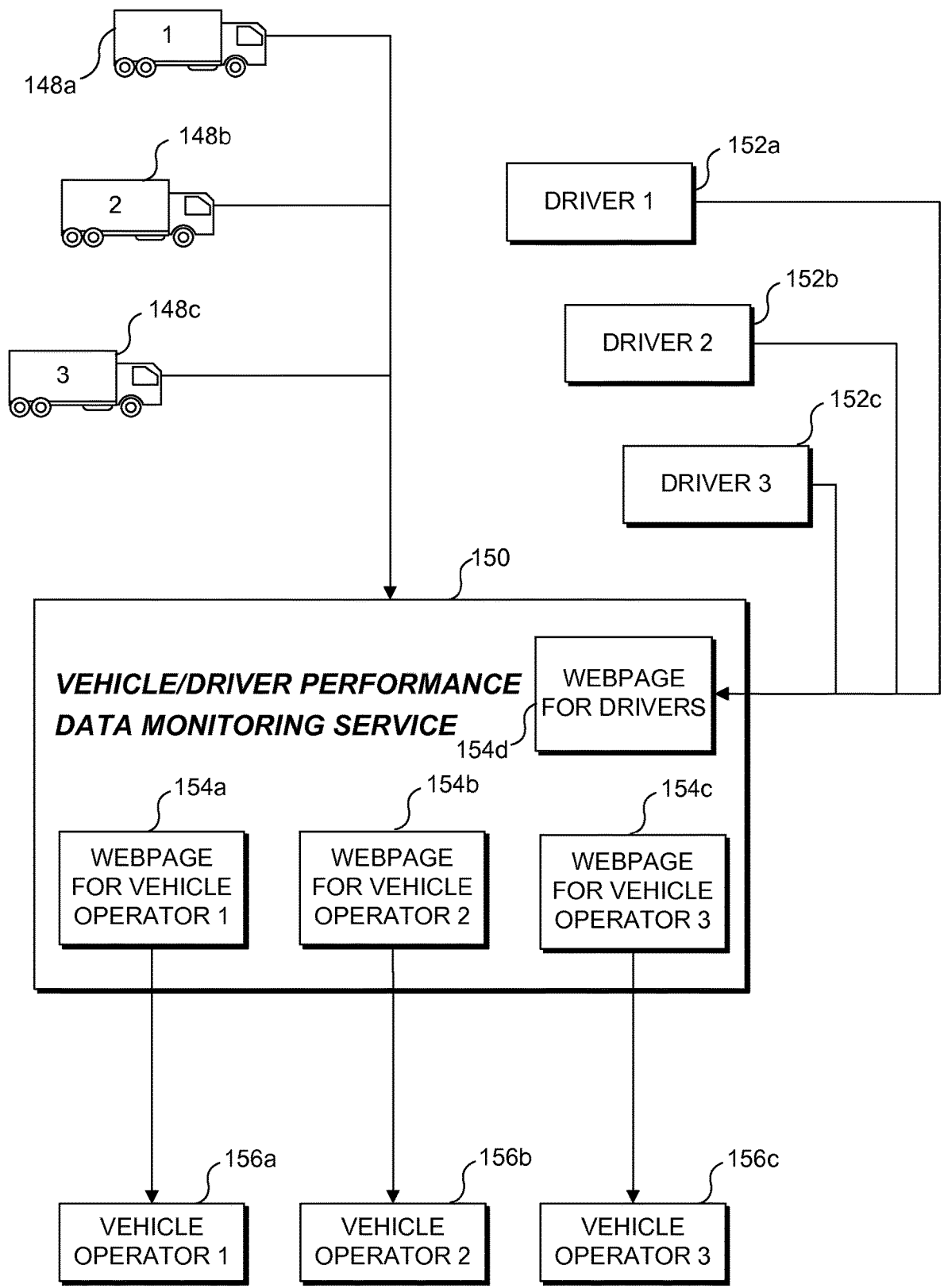
FIG. 5 is a functional block diagram illustrating exemplary elements in a vehicle/driver performance monitoring system in accord with one aspect of the concepts disclosed herein.

FIG. 5 is a functional block diagram of various elements that can be employed to implement the hosted driver/vehicle performance website concept, in one exemplary embodiment. The elements includes a plurality of enrolled vehicles 148a-148c (noting that the concepts disclosed herein can be applied to a different number of vehicles), a plurality of drivers 152a-152c (noting that the concepts disclosed herein can be applied to a different number of drivers), a plurality of vehicle operators 156a-156c (noting that the concepts disclosed herein can be applied to a different number of vehicle operators), and a remote monitoring service 150. Each vehicle includes the components discussed above in connection with FIG. 2 (noting the number and types of sensors disclosed in FIG. 2 are exemplary, and not limiting), enabling the vehicle to convey performance data from the vehicle to remote monitoring service 150, which monitors the performance data from each vehicle 148a-148c over time to enable the driver's performance while operating that vehicle to be evaluated. In an exemplary embodiment monitoring service 150 generates a webpage (as indicated by webpages 154a-154c) for each vehicle operator, so the vehicle operator can review the performance feedbacks of each of their drivers. It should be understand that the concepts disclosed herein also encompass other website designs, and the webpage per fleet is not the only possible model. In one embodiment, drivers will have their own webpage 154d (alternatively, drivers can access the webpage for their specific fleet).

It should be understood that monitoring service 150 is implemented using a remote computing device, and that the term remote computing device is intended to encompass networked computers, including servers and clients, in private networks or as part of the Internet. The monitoring of the vehicle/driver performance data and driver performance feedback by monitoring service 150 can be performed by multiple different computing devices, such that performance data is stored by one element in such a network, retrieved for review by another element in the network, and analyzed by yet another element in the network.

Exemplary System Environment

Figure 6:
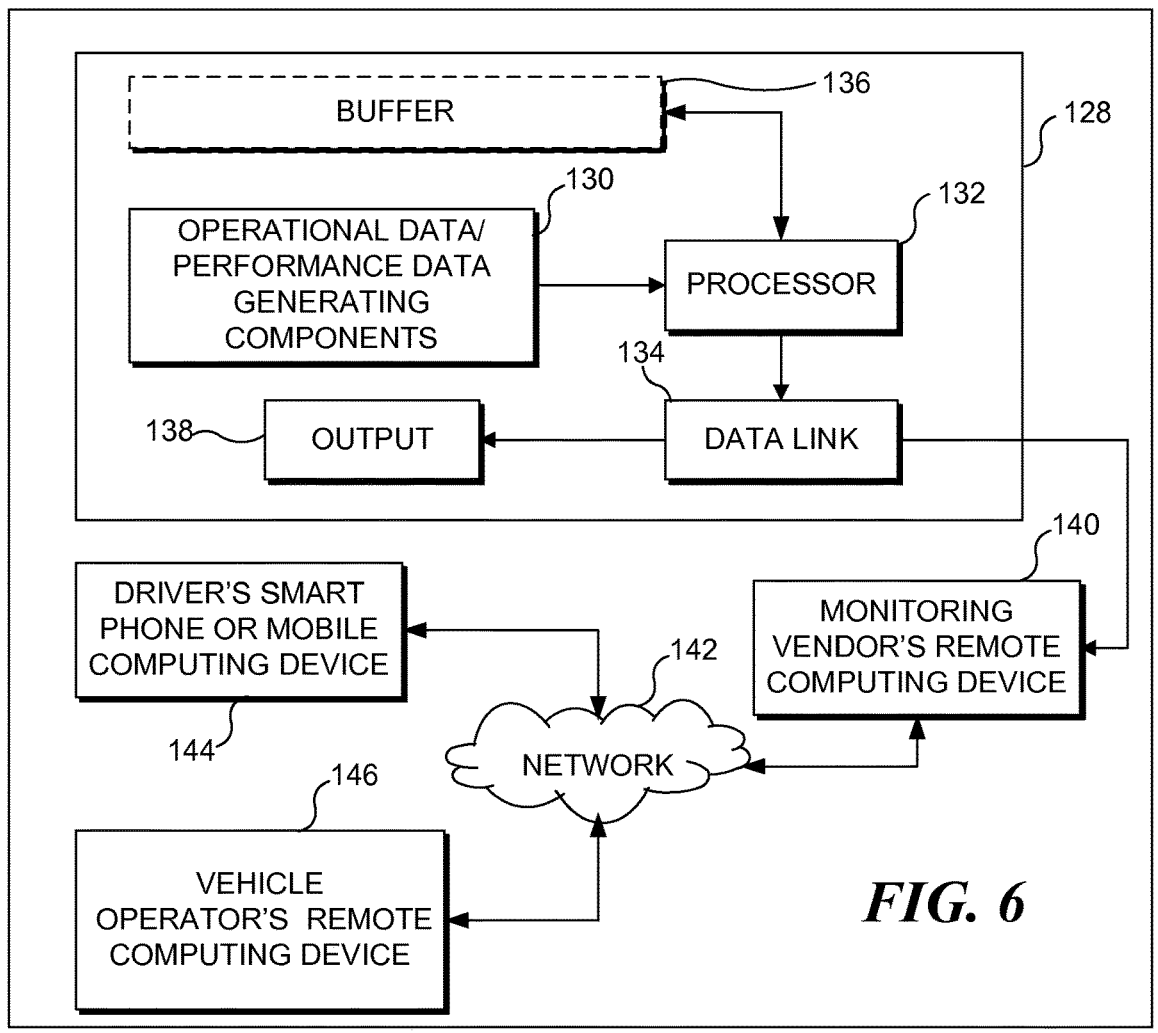
FIG. 6 is a another functional block diagram illustrating exemplary elements in a vehicle/driver performance monitoring system in accord with one aspect of the concepts disclosed herein.

FIG. 6 is a functional block diagram of an exemplary system employed to implement some of the concepts disclosed herein. The functional block diagram illustrates exemplary components used in each vehicle 128 that is enrolled in a vehicle/driver performance monitoring service, to implement some of the method steps discussed above. An exemplary vehicle/driver performance monitoring service is based on adding an optional data buffer 136 (or other short-term memory storage) and a bi-directional data link 134 to each enrolled vehicle (in an exemplary, but not limiting embodiment, the data buffer and data link are combined into a single component). It should be understood that the short term memory storage is not required for embodiments where the performance data transmitted from the enrolled vehicle does not include operational, vehicle, or driver related data that must be briefly stored. In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. Data collected on a portable data collection device during an inspection can also be uploaded through such a data terminal, or independently by direct transmission to the remote monitoring service. While RF data transmission represents an exemplary embodiment, other types of data transmission could be employed. If the vehicle does not already include performance data/operational data collecting components 130, such components are added. Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of performance data from the vehicle to the remote monitoring service, according to one or more of the transmission paradigms discussed herein. In embodiments where the performance data includes temporary storage of operational data, the processor also implements the function of temporarily storing operational data from components 130 in data buffer 136 or other temporary storage, and using bi-directional data link 134 to convey real-time performance data and/or the buffered operational/performance data from the enrolled vehicle to a remote computing device 140 (which is used to analyze the performance of the vehicle and/or driver). It should be understood that those processor functions can be implemented by a single processor, or distributed across multiple processors.

An output 138 is also included, to provide information to the driver in a form that can be easily understood by the driver (generally the speaker/display of FIG. 3). Output 138 can be implemented using a speaker providing an audible output, and using a display providing a visual output. Note that output 138 can be combined into a single component with the data buffer and the data link, so only a single additional component is added to the vehicle (recognizing that most vehicles already include the additional required components, such as the operational data collecting components and the processor). In some embodiments, output 138 is a speaker system already installed in the vehicle, such as an OEM stereo system. In some embodiments, the display and or speakers are part of a smart phone or mobile computing device used by the driver in the vehicle (see element 144).

Figure 8:
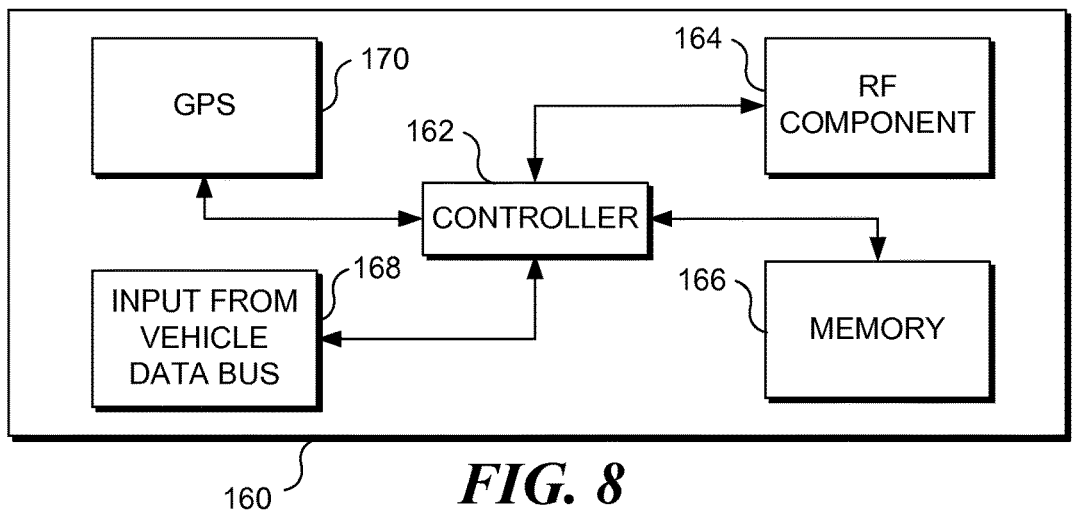
FIG. 8 is a functional block diagram of an exemplary telematics device added to an enrolled vehicle to implement one or more of the methods disclosed herein.

While not specifically shown in FIG. 6, in particularly preferred embodiments the vehicle is equipped with a GPS unit (exemplary GPS units are illustrated in FIGS. 4 and 8). In a related preferred embodiment the processor, the GPS component, any buffer, and data link are combined into a single telematics device. Such a device will send GPS and vehicle/driver performance data to the remote computing device discussed below at a plurality of different times during the course of the operation of the vehicle. In general, the telematics device will transmit data at intervals ranging from as frequently as every 5 to 15 seconds, or as rarely as every 5 minutes, recognizing that such intervals can vary, and are intended to be exemplary, and not limiting.

As indicated in FIG. 6, remote computing device 140 (operated by the monitoring service) is logically coupled via a network 142 (such as the Internet) to a computing device 144 (such as a personal computer, a tablet, or a smart phone) accessible to a driver (in embodiments where driver performance feedbacks are shared with drivers, noting only one such driver device is shown in the Figure; however, the monitoring service will likely be monitoring the performance of a plurality of drivers, each likely having access to a different computing device 144), and a computing device 146 accessible to a vehicle operator (noting that in at least some embodiments, the monitoring service performs the monitoring function for a plurality of different vehicle operators/fleets). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the performance data conveyed to the remote location for diagnosis will include an ID component that enables each enrolled vehicle to be uniquely identified.

Exemplary Computing Environment

Figure 7:
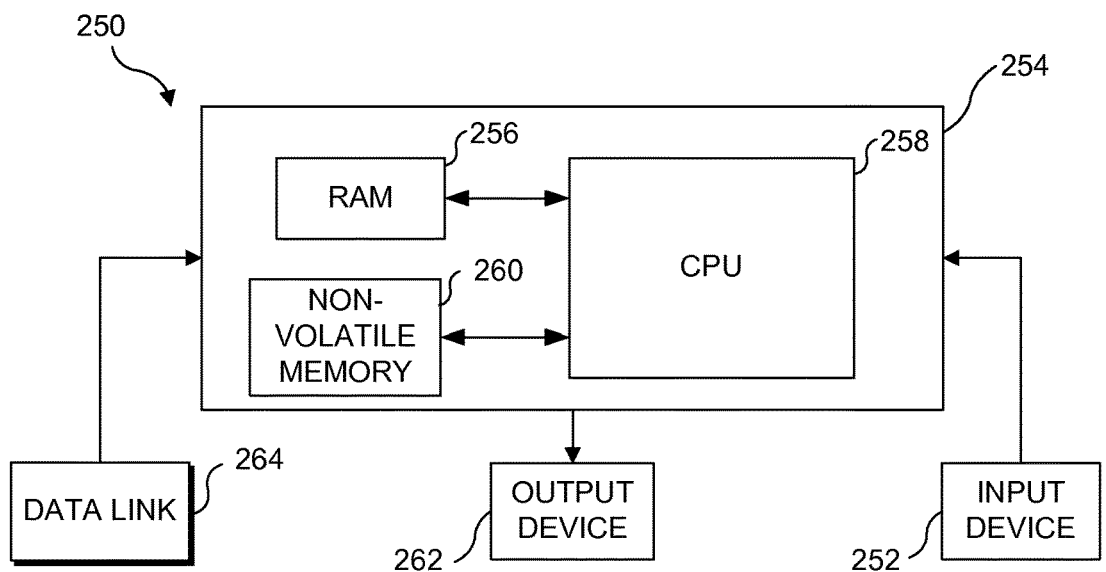
FIG. 7 is an exemplary computing environment for implementing some of the concepts disclosed herein.

FIG. 7 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 7 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of performance data (and in some embodiments, of position data) collected from enrolled vehicles, to identify mechanical faults in the enrolled vehicles. The machine instructions implement functions generally consistent with those described above. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle performance data over time to detect a mechanical fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle, the computing system 250 can be configured to run autonomously, such that a user input device not regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be vehicle performance data (and position data when desired) collected in connection with operation of enrolled vehicles to configured to run autonomously, such that a user output device not regularly employed.

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

Note that vehicle/driver performance data from the enrolled vehicles will be communicated wirelessly in at least some embodiments, either directly to the remote computing system that analyzes the data to evaluate the driver's performance, or to some storage location or other computing system that is linked to computing system 250. Also, the driver feedback will be provided to the driver at the vehicle, generally as discussed above in connection with FIG. 1.

It should be understood that the terms "remote computer", "computing device", and "remote computing device" are intended to encompass a single computer as well as networked computers, including servers and clients, in private networks or as part of the Internet. The vehicle/driver performance data received by the monitoring service from the vehicle can be stored by one element in such a network, retrieved for review by another element in the network, and analyzed by yet another element in the network. While implementation of the methods noted above have been discussed in terms of execution of machine instructions by a processor (i.e., the computing device implementing machine instructions to implement the specific functions noted above), the methods could also be implemented using a custom circuit (such as an application specific integrated circuit or ASIC).

The concepts disclosed herein encompass collecting data from a vehicle during operation of the vehicle. The data collected is used to analyze the performance of at least one of the driver and the vehicle. In some embodiments, the data is collected during operation of the vehicle and wirelessly transmitted from the vehicle during its operation to a remote computing device using a cellular phone network based data link. The frequency of such data transmissions can be varied significantly. In general, more data is better, but data transmission is not free, so there is a tension between cost and performance that is subject to variation based on an end user's needs and desires (some users will be willing to pay for more data, while other users will want to minimize data costs by limiting the quantity of data being transferred, even if that results in a somewhat lower quality data set). The artisan of skill will be able to readily determine a degree to which data quality can be reduced while still provide useful data set.

Exemplary GPS Device with Onboard Computing Environment

FIG. 8 is a functional block diagram of an exemplary telematics device added to an enrolled vehicle to implement one or more of the methods of disclosed herein.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. The exemplary data set discussed above in connection with calculated loaded cost per mile can also be employed. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data id the RF component cannot transfer data. In particularly preferred embodiments the RF components is GSM or cellular technology based.

In at least one embodiment, the controller is configured to implement the method of FIG. 1 by using one or more of data collected from GPS 170 and data from input 168.

Exemplary Tablet for in Vehicle Use

FIG. 9 is a functional block diagram of an exemplary mobile computing device 100 for fleet telematics including a display 106 and a controller 102 configured to present at least one telematics application to a user. A non-transitory physical memory 104 is included, upon which machine instructions define one or more applications are stored. Device 100 includes an option RFID reader 108 (or other sensor) that enables an inspection application to verify that the device is proximate an inspection location (an optical scanner could also be employed, as well as other sensors). In exemplary but not limiting embodiments, the device includes at least one data input 110 that can be used to logically couple the device to a vehicle data bus.

Device 100 may include additional components, including but not limiting to a GSM component, a Wi-Fi component, a USB component, a rechargeable battery, and in at least one embodiment a GPS component.

Significantly, the display (or speakers) of device 100 can be used to provide the driver feedback noted in FIG. 1. The processing of the data in block 14 can be implemented by controller 102, or by some other processor or controller at the vehicle (or even a remote controller, so long as there is a reliable two way data link to the vehicle).

Exemplary Tablets Including a Driver Behavior Application

The following paragraphs discuss various different embodiments of a mobile computing device, such as device 100, implementing a driver feedback application. Such applications are used to monitor and report driver behavior, such as idling, speeding, hard braking, and other factors that can be used to qualitatively measure driver performance.

FIG. 10 is a functional block diagram of device 100 implementing a navigation app that is presented to the driver during vehicle operation on display 106. Significantly, an info pane 107 is not consumed by the map portion, and remains visible to the driver. Any driver feedback alert disclosed herein can be visually present to the driver on info pane 107.

The concepts disclosed herein encompass the following mobile tablet embodiments implementing a driver feedback application, generally consistent with FIG. 1.

A mobile computing device for fleet telematics including a display and a controller configured to execute a driver behavior monitoring application whenever a driver has logged onto the mobile computing device, the driver behavior monitoring application presenting information to the driver regarding his driving behavior as either an icon or a text (or both) on the display at all times, unless the driver is using an inspection application or a driver log application. In an exemplary embodiment the information highlights behavior the driver needs to focus on improving in the current driving session, based on past performance (i.e., improve idle, reduce hard braking, limit speeding events, etc.).

A mobile computing device for fleet telematics including a display and a controller configured to execute a driver behavior monitoring application whenever a driver has logged onto the mobile computing device. While the driver behavior monitoring application is running, driver behavior information is separated into reportable data and advisory data, based on predetermined parameters for a specific driving metric. The advisory data will be used to generate data to be displayed to the driver during vehicle operation, while the reportable data will be conveyed to the fleet owner via a data link. In an exemplary embodiment, the data metrics include one or more of excessive idle, excessive speed events, excessive hard braking events, excessive hard cornering events, lack of use of cruise control, inefficient shifting behavior, and over use of accessory equipment (which can reduce MPG). Whenever an event triggers the collection of advisory data, a popup is presented to the driver indicating that undesirable yet non reportable data has been collected due to the driver's behavior (the popup will graphically and/or textually define the undesired behavior). In some embodiments a similar popup is displayed whenever an event triggers the collection of reportable data. In an exemplary embodiment advisory data is associated with an orange, yellow, or blue color scheme, and reportable data is associated with a red color scheme.

A mobile computing device for fleet telematics including a display and a controller configured to execute a driver behavior monitoring application whenever a driver has logged onto the mobile computing device. Upon execution, the driver behavior monitoring application will review previous data associated with that driver, and determine a specific driver behavior metric to present to the driver as a goal for improvement in a current driving session. In one embodiment that goal will be displayed to the driver on a homepage or desktop of the mobile computing device, where icons for telematics applications stored on the device are presented to the user. In one embodiment that goal will be displayed to the driver in an information pane while a navigation application is running. In one the embodiment the driver behavior monitoring application is configured to select that goal based on identifying the metric from the driver's most recent driving session corresponding to the worst aspect of the driver's last driving session. In one the embodiment the driver behavior monitoring application is configured to select that goal based on identifying one metric from a plurality of the driver's past driving sessions corresponding to the worst aspect of the driver's cumulative behavior during those driving sessions. In one the embodiment the driver behavior monitoring application is configured to select a goal communicated to the mobile computing device from a fleet operator's back office via a data link.

A mobile computing device for fleet telematics including a display and a controller configured to execute a driver behavior monitoring application whenever a driver has logged onto the mobile computing device. Upon execution, the driver behavior monitoring application determines if any trigger definitions have been received at the mobile computing device from a fleet operator's back office via a data link. If so, those trigger definitions are implemented for the current and any future driver monitoring sessions. A fleet operator can use those trigger definition to adjust settings in the driver behavior monitoring application relative to different metrics. For example, a fleet operator may adopt a new idle time standard that is lower than a previously adopted standard and the trigger definition can be used to change the idle time setting in the driver behavior monitoring application. In at least some embodiments, the trigger definition is defined in context of a geographical location. For example, a fleet operator may recognize that high traffic conditions in a certain area will lead to an increase in the number of hard braking events, because commuters continually dart in front of the fleet vehicles. The fleet operator can selectively change the settings of the driver behavior monitoring application for hard braking events in that location to reflect the realities of traffic conditions. The driver behavior monitoring application can similarly be configured to apply such trigger definitions to the current driving session if such trigger definitions are received over a data link during the current driving session.

A mobile computing device for fleet telematics including a display and a controller configured to execute a driver behavior monitoring application whenever a driver has logged onto the mobile computing device. Upon execution, the driver behavior monitoring application will present to the user via a popup or other display the option to review reportable events from the immediately preceding driving session, in order to offer the driver an ability to explain or contest a reportable event. For example, based on traffic conditions, a hard braking event may simply represent a driver responding appropriately to traffic conditions outside his control. If the driver does wish to contest a reportable event, the driver behavior monitoring application prompts the driver to enter a brief explanation, and the driver behavior monitoring application forwards that message to the fleet operator's back office via a data link. In a related embodiment, the driver behavior monitoring application will present to the user via a popup or other display the option to review reportable events from the current driving session in response to the driver attempting to log off of the device or change his duty status.

The following paragraphs discuss various different inputs that can be used by a mobile computing device, such as device 100, when implementing a driver feedback application. Exemplary devices are equipped with, or logically connected to, an array of accelerometers and a GPS receiver, which together are used to monitor driver practices, including idle time events (leaving the truck idling for longer than a threshold amount of time), maximum speed events (driving over the speed limit) and overly strenuous application of the brakes (hard braking). In one preferred embodiment, overly fast cornering is also detected and reported. Significantly, in some embodiments, device 100 is to report certain incidents only to the driver. This is an important practice for gaining driver cooperation for the new system, and for reducing driver anxiety.

In one preferred embodiment, each driver is provided with an RFID tag, which can be scanned into device 100, or a secret pin number to identify him or herself to the tablet. As the driving performance may be important to a driver's career development, it is important to have a system for unerringly identifying the driver credited with the driving performance. Other applications, such as the driver log application and inspection application, will similarly employ verifiable credentials. In at least one embodiment, the tablet cannot be used without first logging onto the tablet using verifiable credentials.

It has been observed that there are some roadway locations where most drivers do engage in hard braking, simply because of the nature of that portion of roadway. Thus device 100 can receive instructions over a data link to ignore hard braking events from certain locations. In one exemplary embodiment, a fleet operator will define such locations using geofencing, and send those geofenced locations over a data link to the fleet operator's tablets. The tablet and backend system are designed to allow for such updates. Such definitions are used by the driver coaching application on the tablet, such that hard braking reporting or hard cornering reporting is ignored from those geofenced locations.

In one preferred embodiment of device 100, each driver is prompted at the end of his or her shift to alert the system operator to any unusual incidents occurring during their shift. For example, if the driver had to brake hard to avoid hitting an errant school bus, he might feel quite slighted if this was held against him in the system statistics.

Exemplary Driver Feedback Devices Including Virtual Trainer Driver Display

Another aspect of the concepts disclosed herein is a driver coaching tool to be used in connection with a telematics device, such as that shown in FIGS. 4 and 8. A commercial implementation of such an accessory device was released as the VIRTUAL TRAINER™.

FIG. 11 schematically illustrates an accessory display 300 that can be used along with a processor in the vehicle to provide feedback to a driver, in accord with the concepts disclosed herein, where the accessory display can also be used to uniquely log in drivers, so any reports identify the correct driver. The accessory display does not possess significant processing power, and is used in connection with some other device at the vehicle that provides the required processing of vehicle data in order to determine what driver feedback should be presented to the driver. A data port on the back enables the accessory device to be logically coupled to the device (such as the devices of FIGS. 4 and 8) providing the processing. The accessory device does not need to include a wireless data link when used in connection with other devices having such functionality. The accessory display provides two basic functions (possibly three). First, the accessory display provides visual feedback to the driver. Second, the accessory display enables drivers to uniquely identify themselves using RFID cards (i.e., the accessory display includes an RFID card reader). If desired, the accessory display can include a speaker to provide audible feedback as well. Also if desired, the RFID component can be eliminated, however, it is desirable to provide some other mechanism to enable drivers to uniquely log into to the driver feedback system (perhaps using a keyboard, biometric device, or other input device in the vehicle and logically coupled to the processor implementing the functions of blocks 14 and 18 of FIG. 1.

Note than an icon of a hand holding a card is shown on the front of the accessory display. The icon provides the driver a visual reference of where the RFID driver card needs to be relative to the accessory display in order to be read.

FIG. 12 schematically illustrates the accessory display of FIG. 11 mounted on the dash of a vehicle, where it can be readily seen by a driver without obscuring the driver's view of the road or dash. Such positioning is exemplary, and not limiting.

FIG. 13 schematically illustrates a driver logging into the driver feedback system using the accessory display of FIG. 11 and an RFID driver card. If desired, an optical scanner or bar code reader can be substituted.

FIG. 14 schematically illustrates the accessory display of FIG. 11 being utilized in an embodiment where a driver is given a specific period of time to correct his driving behavior (such as speeding) before an event is reported (see block 18 of FIG. 1). As shown in FIG. 14, the feedback system has determined that the driver is currently speeding, and the driver is being alerted that in 48 more seconds that speed event will be reported, unless the driver changes is behaviors (i.e., his speed drops below the predefined threshold value).

FIG. 15 graphically illustrates exemplary icons (or images) that can be used to provide driver feedback using the accessory display of FIG. 11, and/or the tablets of FIGS. 9 and 10. The icons include a log in icon, a success log in icon, an invalid log in icon, a non-reportable idle event icon (see block 14 of FIG. 1), a reportable idle event icon (see block 18 of FIG. 1), a non-reportable speed event icon (see block 14 of FIG. 1), a reportable speed event icon (see block 18 of FIG. 1), and a reportable hard braking idle event icon (see block 18 of FIG. 1). Not shown is a non-reportable hard braking idle event icon, but such an icon can be employed. Note that the reportable icons have a color border around the triangular icon, whereas the non-reportable icons omit the border. In at least some embodiments the colors of the reportable icons are different than the colors of the non-reportable icons. In at least one embodiment, the reportable icons are predominantly orange and the non-reportable icons are predominantly blue, noting such colors are exemplary, and not limiting.

Additional details relating to accessory display 300 are provided below (referring to the commercial implementation, the Virtual Trainer Driver Display).

The display is mounted near a driver in a vehicle. The display is logically coupled to a processor in the vehicle (such as a controller in a telematics device of FIGS. 4 and 8, noting that other processors in different devices can be employed, including the processor in a smart phone assigned to the driver, where the smart phone can receive vehicle data over a hardwire or wireless data link). Such a processor monitors vehicle data to provide an indication of the driver's performance on the display.

In an exemplary embodiment, the Virtual Trainer Driver Display includes an RFID reader, and each driver is given an RFID card. Before driving, the Virtual Trainer Driver Display prompts the driver to scan his driver card. That way, the performance of individual drivers can be monitored.

In an exemplary embodiment, a blue triangle with an exclamation point indicates that the driver has exceeded an idle threshold. A similar graphic in orange alerts the driver that his idle metric is now being reported to the vehicle owner/fleet operator. Thus, the Virtual Trainer Driver Display is programmed to provide a warning to drivers before their poor driving performance is reported. Similar graphics are used for speed and hard braking alerts. For metrics over the reporting or warning threshold, data is sent from the telematics device of FIG. 8 to a remote server, where the fleet owner can review the driver performance data. Note the lower stage alerts are not reported to the fleet owner, and only displayed to the driver.

Thus, one aspect of the concepts disclosed herein is a controller configured to execute a driver behavior monitoring application whenever a driver has logged onto the mobile computing device (here implemented by the Virtual Trainer combined with the telematics device of FIG. 8), the driver behavior monitoring application presenting information to the driver regarding his driving behavior as either an icon or a text (or both) on the display at all times. In an exemplary embodiment the information highlights behavior the driver needs to focus on improving in the current driving session, based on past performance.

While the driver behavior monitoring application is running, driver behavior information is separated into reportable data and advisory data, based on predetermined parameters for a specific driving metric. The advisory data will be used to generate data to be displayed to the driver during vehicle operation, while the reportable data will be conveyed to the fleet owner via a data link. In an exemplary embodiment, the data metrics include one or more of excessive idle, excessive speed events, excessive hard braking events, excessive hard cornering events, lack of use of cruise control, inefficient shifting behavior, and over use of accessory equipment (which can reduce MPG). Whenever an event triggers the collection of advisory data, a popup is presented to the driver indicating that undesirable yet non reportable data has been collected due to the driver's behavior (the popup will graphically and/or textually define the undesired behavior). In some embodiments a similar popup is displayed whenever an event triggers the collection of reportable data. In an exemplary embodiment advisory data is associated with an orange, yellow, or blue color scheme, and reportable data is associated with a red color scheme.

In some embodiments, the Virtual Trainer is configured to review previous data associated with that driver upon log in, and determine a specific driver behavior metric to present to the driver as a goal for improvement in a current driving session. In one embodiment that goal will be displayed to the driver after the driver ID card is scanned. In one the embodiment the driver behavior monitoring application is configured to select that goal based on identifying the metric from the driver's most recent driving session corresponding to the worst aspect of the driver's last driving session. In one the embodiment the driver behavior monitoring application is configured to select that goal based on identifying one metric from a plurality of the driver's past driving sessions corresponding to the worst aspect of the driver's cumulative behavior during those driving sessions. In one the embodiment the driver behavior monitoring application is configured to select a goal communicated to the mobile computing device from a fleet operator's back office via a data link.

In another embodiment, the Virtual Trainer is configured to determine after log in if any trigger definitions have been received at the mobile computing device (FIG. 8) from a fleet operator's back office via a data link. If so, those trigger definitions are implemented for the current and any future driver monitoring sessions. A fleet operator can use those trigger definition to adjust settings in the driver behavior monitoring application relative to different metrics. For example, a fleet operator may adopt a new idle time standard that is lower than a previously adopted standard and the trigger definition can be used to change the idle time setting in the driver behavior monitoring application. In at least some embodiments, the trigger definition is defined in context of a geographical location. For example, a fleet operator may recognize that high traffic conditions in a certain area will lead to an increase in the number of hard braking events, because commuters continually dart in front of the fleet vehicles. The fleet operator can selectively change the settings of the driver behavior monitoring application for hard braking events in that location to reflect the realities of traffic conditions. The driver behavior monitoring application can similarly be configured to apply such trigger definitions to the current driving session if such trigger definitions are received over a data link during the current driving session.

Additional Exemplary Parameters for Driver Feedback

While speed, idle, and hard braking are exemplary parameters that can be used to provide driver feedback, it should be understood that the concepts disclosed herein encompass many differ types of performance metrics, and different techniques for collecting them.

While specific parameters or metrics used to derive a driver performance metric have been discussed above, it should be recognized that the following different parameters/metrics are specifically encompassed herein. One or more embodiments in which the performance metric is based at least in part from data collected from one or more engine control units (or vehicle computer) in a vehicle operated by the driver whose performance is being measured. One or more embodiments in which the performance metric is based at least in part on fuel economy. One or more embodiments in which the performance metric is based at least in part on carbon footprint reduction. One or more embodiments in which the performance metric is based at least in part on minimizing fuel efficiency robbing behavior, including sudden braking, rapid acceleration and downshifting too early. One or more embodiments in which the performance metric is based at least in part on maximizing fuel efficiency enhancing behavior, including coasting to a stop (instead of staying on the accelerator until the last minute and then braking hard), high average vehicle speeds with minimum time spent at maximum vehicle speed, high percent trip distance in top gear (90+% recommended), high percent distance in cruise control, minimum percent idle/ PTO operation, minimum service brake activity, low number of sudden decelerations, and low service brake actuation's/ 1000 miles.

Another aspect of the concepts disclosed herein is a technique to monitor vehicle location data (i.e. GPS data) over time to determine the actual operating speed of a fleet vehicle. Many fleet operators have the ability to define maximum speed parameters on their vehicles. Maximum speed parameters are defined to enhance safety and to reduce fuel costs (statistics indicated that for heavy trucks every MPH over 62 MPH reduces fuel economy by 0.1 MPG). However, these speed settings can fail due to maintenance issues, or driver manipulations. The maximum speed setting is based on understanding the size of the vehicle's tires. If during maintenance a different size tire is used as a replacement, the predefined speed settings will be inaccurate. Because drivers are often paid by the mile, drivers have an incentive to defeat the maximum speed settings, and drivers may encourage the use of different tire sizes, so they can go faster than the maximum speed setting, to increase their earnings. Drivers can also purchase and install aftermarket kits designed to bypass speed governors, again so they can go faster than the maximum speed setting, to increase their earnings. The concepts disclosed herein encompass collecting GPS data during the operation of a fleet vehicle, and analyzing the location and time parameters of that data to identify when a fleet vehicle exceeds a predefined maximum speed. The GPS verified speed metric can be used as a driver performance metric on its own, or be combined with other metrics to generate a driver performance metric.

Another aspect of the concepts disclosed herein is to monitor manual overrides for cooling fans in fleet vehicles. Such cooling fans, generally controlled by a vehicle engine control unit (ECU) or vehicle computer, consume up to 50-70 HP, and measurably reduce fuel economy. Drivers who habitually override the automatic fan settings can consume unnecessary amounts of fuel. Thus the concepts disclosed herein encompass monitoring a driver's use of cooling fan manual override, to facilitate an evaluation of a driver's performance, and to enable drivers who use such overrides excessively to be identified and trained to reduce their use of manual cooling fan overrides. The cooling fan manual override metric can be used as a driver performance metric on its own, or be combined with other metrics to generate a driver performance metric.

Another aspect of the concepts disclosed herein is to monitor engine RPMs during a driver's operation of a vehicle. Over revving an engine can lead to increased fuel use and engine wear. Drivers who habitually over rev their vehicles engines can consume unnecessary amounts of fuel. Thus the concepts disclosed herein encompass monitoring the RPM parameters while a driver operates a vehicle, to facilitate an evaluation of a driver's performance, and to enable drivers who consistently over rev their vehicle's engines to be identified and trained to reduce their over revving behavior. The over revving metric can be used as a driver performance metric on its own, or be combined with other metrics to generate a driver performance metric.

Another aspect of the concepts disclosed herein is to monitor the shifting behavior during a driver's operation of a vehicle. Not running a heavy truck in the highest possible gear when possible can lead to increased fuel use and engine wear. Statistics indicate that every 10% drop of time in top gear results in a 0.5% MPG loss. Thus the concepts disclosed herein encompass monitoring shifting behavior while a driver operates a vehicle, to facilitate an evaluation of a driver's performance, and to enable drivers who consistently under shift to be identified and trained to reduce their over revving behavior. The shifting pattern metric can be used as a driver performance metric on its own, or be combined with other metrics to generate a driver performance metric.

Another aspect of the concepts disclosed herein is to monitor the amount if idle time during a driver's operation of a vehicle. Increased idle time leads to increased fuel use and engine wear. Thus the concepts disclosed herein encompass monitoring idle time behavior while a driver operates a vehicle, to facilitate an evaluation of a driver's performance, and to enable drivers who excessively allow their vehicle to idle to be identified and trained to reduce their excess idle behavior. The excessive idle metric can be used as a driver performance metric on its own, or be combined with other metrics to generate a driver performance metric.

Another aspect of the concepts disclosed herein is to monitor a load placed upon a vehicle's engine during a driver's operation of a vehicle. While related to RPM, load is not equivalent. An estimation of engine load is sometimes calculated by a vehicle ECU, and different manufacturers use different combinations of parameters to calculate engine load, including but not limited to throttle position, RPM, manifold pressure, air flow, temperature, air conditioning clutch status, power steering pressure, and transmission gear status. Where engine load is increased without performing more useful work (i.e., carrying more cargo), increased fuel use and engine wear result without a net benefit. Drivers who habitually operate their vehicles under higher engine loads than required consume unnecessary amounts of fuel. Thus the concepts disclosed herein encompass monitoring engine load while a driver operates a vehicle, to facilitate an evaluation of a driver's performance, and to enable drivers who consistently over load their vehicle's engines to be identified and trained to reduce their over loading behavior. The engine load metric can be used as a driver performance metric on its own, or be combined with other metrics to generate a driver performance metric.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

What is claimed is:

1. A system to train a driver during operation of a vehicle, the system comprising:
   (a) an interface to at least one vehicle data generating component that generates time-indexed vehicle data when the vehicle is operating;
   (b) a display to locally present on a first portion of the display a map relevant to a present geographic location of the vehicle and to further present concurrently on a second portion of the display driver feedback information during vehicle operation; and
   (c) at least one processor logically coupled to the display, the at least one processor configured to evaluate driver performance by:
      (i) automatically analyzing the time-indexed vehicle data to determine if any of the time-indexed vehicle data has crossed a first predefined threshold, and if so automatically directing presentation, on the second portion of the display, driver feedback information indicating the first predefined threshold has been crossed and refraining from reporting to any remote entity that the first predefined threshold has been crossed; and
      (ii) automatically analyzing additional time-indexed vehicle data to determine if any of the additional time-indexed vehicle data crosses a second predefined threshold; and, if so, automatically directing presentation, on the second portion of the display, driver feedback information indicating the second predefined threshold has been crossed and using a wireless data link to automatically report to a remote computing device that the second predefined threshold has been crossed; and
   (d) a local input mechanism to accept a driver entered explanation for a second predefined threshold crossing that was reported to the remote computing device.

2. The system of claim 1, wherein the at least one processor is part of a first computing device, and the display is part of an accessory display that includes an RFID card reader enabling drivers to uniquely identify themselves.

3. The system of claim 1, wherein the at least one processor is part of a first computing device, and the display is part of a second computing device including a screen and a navigation application that automatically employs a first portion of the screen to present a map to the driver, and automatically employs a second portion of the screen to present the information indicating the first or second baseline has been crossed.

4. The system of claim 1, comprising:
   an accessory device for use in the vehicle to provide the driver feedback information, the accessory device including:
      (a) a housing;
      (b) a data port for importing driver entered data;
      (c) the display upon which the driver feedback information can be presented; and
      (d) an RFID card reader enabling the driver to use an RFID card to input unique identification information.

5. The system of claim 4, wherein the accessory device includes a graphical element on the housing indicating where the driver should present the RFID card to be read.

6. A method of producing a performance metric indicative of a performance of a driver based on at least one metric corresponding to the driver's operation of a vehicle, and sharing that metric with the driver during driving, comprising:
- (a) automatically collecting first vehicle data for evaluation of the driver's performance while the vehicle is operating, the first vehicle data including at least two of idle data, acceleration data, speed data, braking data, vehicle location data, and length of time data;
- (b) using a computing device to automatically analyze the first vehicle data and determine if a driver has crossed any one of a plurality of first baselines, each of the plurality of first baselines associated with a different type of the collected first vehicle data;
- (c) for each first baseline that is crossed, automatically displaying on a local display of the vehicle one of a plurality of first events associated with the respective first baseline that was crossed, each associated first event indicating which of the plurality of first baselines has been crossed, and refraining from reporting any first event to any remote entity;
- (d) automatically collecting second vehicle data while the vehicle is operating, the second vehicle data including data of a type corresponding to at least one first baseline that was crossed;
- (e) using the computing device to automatically analyze the second vehicle data and determine if a driver has crossed any one of a plurality of second baselines, each of the plurality of second baselines associated with one of the different types of vehicle data, and further using the computing device to determine if the length of time data indicates that any one of the plurality of first baselines has remained crossed for longer than an associated predetermined time limit;
- (f) for each second baseline that is crossed, automatically displaying on the local display one of a plurality of second events associated with either the respective second baseline that was crossed or the respective first baseline that has remained crossed for longer than its associated predetermined time limit, each associated second event indicating which of the plurality of second baselines has been crossed or which of the first baselines has remained crossed, and automatically using a wireless data link to report a second event of the plurality of second events to a remote computing device;
- (g) accepting, via an input mechanism in the vehicle, a driver explanation for the second event that was reported to the remote computing device; and
- (h) automatically reporting each entered explanation to the remote computing device using the wireless data link.

7. The method of claim 6, further comprising:
automatically prompting the driver to log in at vehicle start up.

8. The method of claim 7, further comprising:
enabling a driver to log in using a device having an associated RFID circuit.

9. The method of claim 7, wherein the plurality of first baselines are default baselines and further comprising:
automatically determining if the driver identified during log in has any custom baseline definitions, and if so utilizing those custom baseline definitions in place of the default baselines.

10. The method of claim 7, further comprising:
- (a) automatically determining if the driver has any metrics for which at least one of the first and second baselines were crossed during a prior driving session; and if so;
- (b) automatically displaying to the driver on the local display at least one such metric whose baseline was crossed in the prior driving session.

11. The method of claim 10, wherein automatically displaying to the driver on the local display at least one such metric whose baseline was crossed in the prior driving session comprises:
displaying the metric whose baseline was crossed most often during the prior driving session.

12. The method of claim 6, further comprising:
enabling a remote user to selectively redefine at least one of the first and second baselines.

13. The method of claim 12, wherein the accessory display includes an RFID reader usable by the driver for self-identification before driving.

14. The method of claim 6, wherein (b) and (d) are implemented using a first computing device, and (c) and (e) are implemented using an accessory display logically coupled to the first computing device.

15. The method of claim 6, wherein (c) and (e) are implemented using a mobile computing device including a screen and a navigation application that automatically employs a first portion of the screen to present a map to the driver, and automatically employs a second portion of the screen to present the information indicating the first or second baseline has been crossed.

16. The method of claim 15, wherein the second portion of the screen is not a primary portion that is not obscurable by the first portion of the screen.

17. The method of claim 15, wherein the second portion of the screen is configured to present a specific driver behavior metric as a goal for improvement in a current driving session.

18. The method of claim 6, further comprising:
- (h) receiving from the remote computing device via the wireless data link an updated specific metric associated with a second type of vehicle data different from the first type of vehicle data, an updated first baseline value, and an updated second baseline value; and
- (i) performing (a) (g) using the updated specific metric, the updated first baseline value, and the updated second baseline value in place of the specific metric, the first baseline, and the second baseline, respectively.

19. A non-transitory memory medium having machine instructions stored thereon to carry out a method, the method comprising:
- (a) automatically collecting vehicle data associated with a driver's performance while the driver is operating a vehicle, the vehicle data including idle data, acceleration data, speed data, braking data, vehicle location data, and length of time data;
- (b) automatically analyzing the vehicle data to determine if a driver has crossed any one of a plurality of first baselines, each of the plurality of first baselines associated with a different specific metric;
- (c) for each first baseline that is crossed, automatically locally displaying one of a plurality of first events associated with the respective first baseline that was crossed, each associated first event indicating which of the plurality of first baselines has been crossed, and refraining from reporting any first event driver information to any remote entity;
- (d) automatically analyzing the vehicle data to determine if a driver has crossed any one of a plurality of second baselines, each of the plurality of second baselines associated with one of the different specific metrics, and further using a computing device to determine if the length of time data indicates that any one of the plurality of first baselines has remained crossed for longer than an associated predetermined time limit;

(e) for each second baseline that is crossed, automatically locally displaying one of a plurality of second events associated with either the respective second baseline that was crossed or the respective first baseline that has remained crossed for longer than its associated predetermined time limit, each associated second event indicating which of the plurality of second baselines has been crossed or which of the first baselines has remained crossed, and automatically using a wireless data link to report any second event to a remote computing device;

(f) providing an input mechanism in the vehicle via which the driver can enter an explanation for any second event that was reported to the remote computing device; and (g) automatically reporting each entered explanation to the remote computing device using the wireless data link.

* * * * *